United States Patent
Kuwahara

(10) Patent No.: US 9,143,054 B2
(45) Date of Patent: Sep. 22, 2015

(54) MULTILEVEL CONVERSION CIRCUIT

(71) Applicant: FUJI ELECTRIC CO., LTD., Kawasaki-shi (JP)

(72) Inventor: Hiroyuki Kuwahara, Tokyo (JP)

(73) Assignee: FUJI ELECTRIC CO., LTD. (JP)

(*) Notice: Subject to any disclaimer, the term of this patent is extended or adjusted under 35 U.S.C. 154(b) by 36 days.

(21) Appl. No.: 14/242,331

(22) Filed: Apr. 1, 2014

(65) Prior Publication Data

US 2014/0313802 A1    Oct. 23, 2014

(30) Foreign Application Priority Data

Apr. 22, 2013  (JP) .................................. 2013-089452

(51) Int. Cl.
| | |
|---|---|
| *H02M 1/32* | (2007.01) |
| *H02M 7/5387* | (2007.01) |
| *H02M 1/34* | (2007.01) |
| *H02M 7/493* | (2007.01) |
| *H02M 7/537* | (2006.01) |
| *H02M 7/483* | (2007.01) |
| H02M 7/487 | (2007.01) |

(52) U.S. Cl.
CPC .............. *H02M 7/537* (2013.01); *H02M 7/483* (2013.01); *H02M 7/487* (2013.01)

(58) Field of Classification Search
CPC ..... H02M 7/5387; H02M 7/487; H02M 1/36; H02M 7/483; H02M 7/1203

USPC ........ 363/50, 55, 56, 56.01, 56.02, 56.05, 71, 363/131
See application file for complete search history.

(56) References Cited

U.S. PATENT DOCUMENTS

| | | | | |
|---|---|---|---|---|
| 2008/0315859 | A1 | 12/2008 | Ponnaluri et al. | |
| 2013/0088901 | A1* | 4/2013 | Bleus et al. | ...................... 363/71 |
| 2013/0258728 | A1* | 10/2013 | Takizawa | ........................ 363/50 |
| 2013/0270917 | A1* | 10/2013 | Yatsu | ............................... 307/77 |
| 2014/0339899 | A1* | 11/2014 | Takizawa | ........................ 307/63 |
| 2015/0003127 | A1* | 1/2015 | Takizawa | ........................ 363/50 |

FOREIGN PATENT DOCUMENTS

| | | |
|---|---|---|
| EP | 2487786 A2 | 8/2012 |
| JP | 2009-525717 A | 7/2009 |
| JP | 2012-182974 A | 9/2012 |
| JP | 2013-146117 A | 7/2013 |

* cited by examiner

*Primary Examiner* — Timothy J Dole
*Assistant Examiner* — Sisay G Tiku
(74) *Attorney, Agent, or Firm* — Rossi, Kimms & McDowell LLP

(57) ABSTRACT

In aspects of the invention, a multilevel conversion circuit can include a configuration for linking capacitors, including diodes, reverse-blocking semiconductor switches, and resistors, and a circuit for clamping the capacitor voltage at a specified voltage. Such a configuration can serve to reduce the number of capacitors that need detection of the voltages thereof and appropriate changing-over operation of semiconductor switches to control the capacitor voltage to a desired value. By way of aspects of the invention, desired voltages can be provided to the capacitors.

9 Claims, 19 Drawing Sheets

MULTILEVEL CONVERSION CIRCUIT

CROSS-REFERENCE TO RELATED APPLICATION

This application is based on, and claims priority to, Japanese Patent Application No. 2013-089452, filed on Apr. 22, 2013, the contents of which are incorporated herein by reference.

BACKGROUND OF THE INVENTION

1. Field of the Invention

Embodiments of the invention relate to multilevel conversion circuits that deliver multilevel voltages.

2. Description of the Related Art

FIG. 10 shows an example of a five-level conversion circuit using flying capacitors disclosed in Japanese Unexamined Patent Application Publication No. 2012-182974. This conversion circuit delivers five levels of voltage from a DC power supply composed of series-connected two DC single power supplies DP and DN having three terminals: positive terminal P, a zero terminal M, and a negative terminal N. A series circuit of semiconductor switches S1 through S4, each composed of antiparallel-connected diode and an IGBT, is connected between the positive terminal P and the negative terminal N of the DC power supply. In parallel to a series circuit of the semiconductor switches S2 and S3 connected are a series circuit of the semiconductor switches S5 and S6 and a capacitor C1 called a flying capacitor. An AC switch composed of reverse blocking IGBTs S15 and S16 that exhibits withstand voltage in a reversed direction is connected between the connection point between the semiconductor switches S5 and S6 and the zero terminal M that is a middle potential point of the DC power supply. An AC terminal U is the connection point between the semiconductor switches S2 and S3.

When the voltage Edcp and Edcn of the respective DC single power supplies DP and DN are each 2E and the voltage Vc1 across the capacitor C1 is controlled at E, the circuit having the construction described above delivers five levels of voltage at the AC terminal U. For instance, when the semiconductor switches S1, S2, S6, and S16 are in the ON state, a voltage 2E is delivered from the AC terminal U; when the semiconductor switches S1, S3, S6, and S16 are in the ON state, or the semiconductor switches S2 and S6 and the AC switch Sac are in the ON state, a voltage E is delivered; when the semiconductor switches S3 and S6 and the AC switch Sac are in the ON state, or the semiconductor switches S2 and S5 and the AC switch Sac are in the ON state, a voltage zero is delivered; when the semiconductor switches S2, S4, S5, and S15 are in the ON state, or the semiconductor switches S3 and S5 and the AC switch Sac are in the ON state, a voltage –E is delivered; and when the semiconductor switches S3, S4, S5, and S15 are in the ON state, a voltage –2E is delivered at the AC terminal U.

In this operation, there are two modes for deliver a voltage E from the AC terminal U in the direction of current toward the load. One of them is through a path 1: the semiconductor switch S1→the capacitor C1→the semiconductor switch S3; the other is through a path 2: the AC switch Sac→the semiconductor switch S6→the capacitor C1→the semiconductor switch S2. The capacitor C1 is charged through the path 1 and discharged through the path 2. The average voltage of the capacitor C1 can be controlled at the value E by detecting the voltage of the capacitor C1 and appropriately selecting the paths in order for the average value of the voltage to be E. There are similarly two paths for the mode to deliver a voltage –E from the AC terminal U, and the average voltage of the capacitor C1 can be controlled at the value E.

FIG. 11 shows an example of conversion circuit that is an extended conversion circuit of seven levels from the conversion circuit of five levels shown in FIG. 10. The seven level conversion circuit of FIG. 11 has a circuit construction to deliver seven levels of voltage from a DC power supply composed of DC single power supplies DP and DN and having three terminals of a positive terminal P, a zero terminal M, and a negative terminal N. Between the positive terminal P and the negative terminal N connected is a series circuit of semiconductor switches S1 through S6 each consisting of a diode and an IGBT antiparallel-connected with each other. In parallel to the series circuit of semiconductor switches S2 through S5 connected are a capacitor C2 and a series circuit of the semiconductor switches S7 and S8. In parallel to the series circuit of semiconductor switches S3 and S4 connected is a capacitor C1. Between the connection point between the semiconductor switches S7 and S8 and the zero terminal M, i.e. the middle potential point of the DC power supply, connected is an AC switch Sac consisting of antiparallel-connected reverse-blocking IGBTs S15 and S16 each exhibiting a withstand voltage in the reverse direction. The connection point between the semiconductor switches S3 and S4 is the AC terminal U.

In this circuit construction, when the voltages Edcp and Edcn of the DC single power supplies DP and DN are each 3E, and the voltage Vc1 across the capacitor C1 is controlled at E and the voltage Vc2 across the capacitor C2 is controlled at 2E, seven levels of voltages are delivered from the AC terminal U. For example, when the semiconductor switches S1 through S3 are in the ON state, a voltage 3E is delivered from the AC terminal U; when the semiconductor switches S1, S2, and S4 are in the ON state, a voltage 2E is delivered; when the semiconductor switches S1, S5, and S4 are in the ON state, a voltage E is delivered; when the AC switch Sac and the semiconductor switches S7, S2, and S3, or the AC switch Sac and the semiconductor switches S8, S5, and S4 are in the ON state, a voltage zero is delivered; when the AC switch Sac and the semiconductor switches S7, S2, and S4 are in the ON state, a voltage –E is delivered; when the AC switch Sac and the semiconductor switches S7, S5, and S4 are in the ON state, a voltage –2E is delivered; and when the semiconductor switches S4 through S6 are in the ON state, a voltage –3E is delivered from the AC terminal U. In detail, there are a plurality of control modes other than the ones describe above. They are, however, extended operation of the circuits shown in FIG. 11 and thus detailed description thereon is omitted here.

In this operation, there are two modes for delivering a voltage E from the AC terminal U. One of them is through a path 1: the semiconductor switch S1→the capacitor C2→the semiconductor switch S5→the semiconductor switch S4; the other is through a path 2: the AC switch Sac→the semiconductor switch S8→the capacitor C2→the semiconductor switch S2→the capacitor C1→the semiconductor switch S4. The capacitor C2 is charged through the path 1 and discharged through the path 2. The average voltage of the capacitor C2 can be controlled at the value 2E by detecting the voltage of the capacitor C2 and appropriately selecting the paths in order for the average value of the voltage to be 2E. There are similarly two paths for the mode to deliver a voltage –E from the AC terminal U, and the average voltage of the capacitor C2 can be controlled at the value 2E by appropriately selecting the paths.

There are two modes for delivering a voltage 2E from the AC terminal U. One of them is through a path 1: the semiconductor switch S1→the semiconductor switch S2→the capacitor C1→the semiconductor switch S4; the other is through a path 2: the semiconductor switch S1→the capacitor C2→the semiconductor switch S5→the capacitor C1→the semiconductor switch S3. The capacitor C1 is charged through the path 1 and discharged through the path 2. The average voltage of the capacitor C1 can be controlled at the value E by detecting the voltage of the capacitor C1 and appropriately selecting the paths in order for the average value of the voltage to be E. There are similarly two paths for the mode to deliver a voltage −2E from the AC terminal U, and the average voltage of the capacitor C1 can be controlled at the value E.

In the seven-level conversion circuit having the construction of FIG. 11, the semiconductor switches S7 and S8 conduct switching with a voltage variation step of two units, i.e. 2E. A large voltage variation in an output waveform generally produces a high micro surge voltage on an AC motor, for example, in the load side corresponding to the voltage variation, causing a problem of dielectric breakdown.

In order to deal with this problem, the inventor of the present invention has proposed the circuit disclosed in Japanese Unexamined Patent Application Publication No. 2013-146117. FIG. 12 shows the construction of the circuit, in which a DC power supply consisting of series-connected DC single power supplies DP and DN has terminals of a positive terminal P, a zero terminal M, and a negative terminal N in the order of descending electric potential. The terminal M is the base terminal at a potential of zero. Semiconductor switches in the following description are IGBTs each having an antiparallel-connected diode. The other types of semiconductor switchers can be employed, of course. A series circuit of semiconductor switches S1 through S6 are connected between the positive terminal P and the negative terminal N. The connection point between the semiconductor switches S3 and S4 is an AC terminal U. A series circuit of semiconductor switches S7 through S10 and a capacitor C2 are connected between the connection point between the semiconductor switches S1 and S2 and the connection point between the semiconductors switches S5 and S6. An AC switch Sac composed of antiparallel-connected reverse blocking IGBTs S15 and S16 is connected between the zero terminal M and the connection point between the semiconductor switches S8 and S9.

Further, a capacitor C1 is connected between the higher potential terminal of the semiconductor switch S3 and the lower potential terminal of the semiconductor switch S4, and a capacitor C3 is connected between the higher potential terminal of the semiconductor switch S8 and the lower potential terminal of the semiconductor switch S9. The capacitors C1, C2, and C3 are called flying capacitors. The AC switch Sac can be composed, in place of using the construction of antiparallel connection of the semiconductor switches S15 and S16 each exhibiting reverse-blocking ability shown in FIG. 12, by combination of IGBTs without reverse-blocking ability and diodes as shown in FIGS. 13A-13C. The circuit in FIG. 13A is composed of antiparallel-connected two series circuits each consisting of a diode and an IGBT. The circuits in FIGS. 13B and 13C are composed of two circuits connected in series, each circuit consisting of antiparallel-connected diode and an IGBT.

The magnitude of the voltage of each of the DC single power supplies DP and DN in the circuit of FIG. 12 is supposed here to be 3E. Similarly to the conventional example of FIG. 11, the voltages Vc1, Vc2, and Vc3 of the capacitors C1, C2, and C3 are changed by charging or discharging the capacitors to hold average values of Vc1=E, Vc2=2E, and Vc3=E. When the potential at the zero terminal M is zero, the output voltage Vu at the AC terminal U can be obtained at seven levels of ±3E, ±2E, ±E, and zero by ON/OFF operation of the semiconductor switches. For example, when the semiconductor switches S1, S2, S3, S9, S10, and S16 are in an ON state and the other semiconductor switches are in an OFF state, as shown in FIG. 14A, the output voltage at the AC terminal U is +3E, which is the voltage at the terminal P of the DC single power supply DP. When the semiconductor switches S1, S3, S5, S9, S10, and S16 are in the ON state and the other semiconductor switches are in the OFF state as shown in FIG. 14B, the output voltage at the AC terminal U is +2E, which is the voltage +3E of the DC single power supply DP minus the voltage +2E of the capacitor voltage Vc2 plus the voltage +E of the capacitor voltage Vc1.

When the semiconductor switches S3, S5, S9, S10, S15, and S16 are in the ON state and the other semiconductor swathes are in the OFF state as shown in FIG. 14C, the output voltage at the AC terminal U is +E, which is the potential zero at the terminal M of the DC power supply plus the voltage +E of the capacitor voltage Vc1. When the semiconductor switches S4, S5, S9, S10, S15, and S16 are in the ON state and the other semiconductor switches are in the OFF state as shown in FIG. 14D the output voltage at the AC terminal U is zero, which is the potential at the terminal M of the DC power supply. When the semiconductor switches S3, S5, S7, S9, S15, and S16 are in the ON state and the other semiconductor switches are in the OFF state as shown in FIG. 14E, the output voltage at the AC terminal U is zero, which is the voltage zero at the terminal M of the DC power supply plus the voltage +1E of the capacitor voltage Vc3 minus the voltage +2E of the capacitor voltage Vc2 plus the voltage +1E of the capacitor voltage Vc1.

Electric current flows from the terminal P, M, or N to the AC terminal U as a result of ON/OFF operation of the semiconductor switches in the paths shown in FIGS. 14A through 14E, while charging or discharging the capacitors. There are a multiple of paths for a mode to obtain the same voltage at the AC output terminal similarly to the five-level conversion circuit of FIG. 10 and the seven-level conversion circuit of FIG. 11. By detecting the voltages of the capacitors and selecting an appropriate path, the voltage control is possible for the capacitors C1 and C3 in FIG. 12 at E and the capacitor C2 at 2E. Other combination of paths can deliver a desired voltage and charge or discharge the capacitors, through details are omitted here.

The conversion circuit of FIG. 12 provides seven levels of output voltages Vu from the DC power supply having three levels of potential terminals combining the voltages Edcp and Edcn of the DC single power supplies DP and DN and the voltages Vc1, Vc2, and Vc3 of the capacitors C1, C2, and C3 by means of ON/OFF operation of the semiconductor switches. In order to obtain seven levels of output voltages, the average value of the voltage Vc1 across the capacitor C1 is necessarily E, the average value of the voltage Vc2 across the capacitor C2 is necessarily 2E, and the average value of the voltage Vc3 across the capacitor C3 is necessarily E. In actual operation of the circuit, however, the capacitor voltages Vc1, Vc2, and Vc3 change due to the current running in the circuit. In generally employed method for holding the capacitor voltages at the average values, ON/OFF operation of the semiconductor switches S1 through S10 and the AC switch Sac is combined to deliver desired voltages and simultaneously control charging and discharging of the capacitors C1, C2, and C3. This control needs a means for detecting the capacitor voltages Vc1, Vc2, and Vc3. Nevertheless, the capacitors have no common potential part. Thus, the voltage detecting circuit needs an insulating function, which increases device costs.

SUMMARY OF THE INVENTION

Embodiments of the invention address the above-described and other shortcomings in the related art. Some embodiments provide a multilevel conversion circuit capable of controlling the capacitor voltages to desired values at a low cost in which some of the capacitors used in the multilevel conversion circuit is not provided with a voltage detecting circuit.

A first aspect of the present invention is a multilevel conversion circuit that generates multi-levels of voltage from a DC power supply provided with three terminals, composed of two single power supplies, and having three different voltage levels including zero, and selects and delivers the multi-levels of voltage, the multilevel conversion circuit comprising: first and second switch groups, each switch group comprising series-connected n semiconductor switches, n being an integer of three or larger, having an antiparallel-connected diode; third and fourth switch groups, each switch group comprising series-connected (n−1) semiconductor switches; and an AC switch composed of a combination of reverse-blocking semiconductor switches; wherein a series circuit of the first switch group and the second switch group is connected between a first DC terminal that is one of the three terminals of the DC power supply at the highest potential and a third DC terminal that is one of the three terminals of the DC power supply at the lowest potential, the first switch group being connected to the first DC terminal; a series circuit of the third switch group and the fourth switch group is connected between a negative terminal of a first semiconductor switch composing the first switch group and a positive terminal of an n-th semiconductor switch composing the second switch group, the third switch group being connected to the negative terminal of the first semiconductor switch of the first switch group; the AC switch is connected between a connection point of the third switch group and the fourth switch group and a second DC terminal that is one of the three terminals of the DC power supply at a middle potential; a j-th capacitor, j being an integer from 1 to (n−2), is connected between a positive terminal of an (n−m)-th semiconductor switch composing the first switch group, m being an integer from 0 to (n−3), and a negative terminal of a k-th semiconductor switch composing the second switch group, k being an integer from 1 to (n−2); an (n−1)-th capacitor is connected between a positive side terminal of the third switch group and a negative side terminal of the fourth switch group; an i-th capacitor, i being an integer from n to (2n−3), is connected between a positive terminal of (n−m−1)-th semiconductor switch composing the third switch group and a negative terminal of k-th semiconductor switch composing the fourth switch group; a connection point between the first switch group and the second switch group is an AC terminal; and a linking means connects a terminal of the j-th capacitor and a terminal of the i-th capacitor.

A second aspect of the invention is the multilevel conversion circuit according to the first aspect of the invention, wherein a j-th diode, which is the linking means, is connected between a positive terminal of the j-th capacitor and a negative terminal of the i-th capacitor; and an (i−1)-th diode, which is the linking means, is connected between a positive terminal of the i-th capacitor and a negative terminal of the j-th capacitor.

A third aspect of the invention is the multilevel conversion circuit according to the first aspect of the invention, wherein a series circuit of a j-th diode and a j-th resistor, the series circuit being the linking means, is connected between a positive terminal of the j-th capacitor and a negative terminal of the i-th capacitor; and a series circuit of an (i−1)-th diode and an (i−1)-th resistor, the series circuit being the linking means, is connected between a positive terminal of the i-th capacitor and a negative terminal of the j-th capacitor.

A fourth aspect of the invention is the multilevel conversion circuit according to the first aspect of the invention, wherein a j-th reverse blocking semiconductor switch, which is the linking means, is connected between a positive terminal of the j-th capacitor and a negative terminal of the i-th capacitor; and an (i−1)-th reverse blocking semiconductor switch, which is the linking means, is connected between a positive terminal of the i-th capacitor and a negative terminal of the j-th capacitor.

A fifth aspect of the invention is the multilevel conversion circuit according to the first aspect of the invention, wherein a j-th impedance element, which is the linking means, is connected between a positive terminal of the j-th capacitor and a positive terminal of the i-th capacitor; and an (i−1)-th impedance element, which is the linking means, is connected between a negative terminal of the i-th capacitor and a negative terminal of the j-th capacitor.

A sixth aspect of the invention is the multilevel conversion circuit according to any one of the second through fifth aspects of the invention, wherein a Zener diode is connected in parallel with the j-th capacitor, the (n−1)-th capacitor, or the i-th capacitor.

A multilevel conversion circuit, which is of a flying capacitor type, of some embodiments of the invention comprises a linking means between flying capacitors. This means allows for the omission of voltage detection of some of the capacitors in the conversion circuit, yet controlling the capacitor voltages at desired values. Therefore, the number of capacitor voltage detection circuits is reduced, resulting in reduction of device costs.

DETAILED DESCRIPTION

A multilevel conversion circuit of embodiments of the invention generates multi-levels of voltage from a DC power supply having three voltage levels, the multilevel conversion circuit comprising: a series circuit of first and second switch groups connected between a positive terminal and a negative terminal of the power supply, each switch group comprising series-connected n semiconductor switches, n being an integer of three or larger; a series circuit of third and fourth switch groups connected between a negative terminal of a first semiconductor switch composing the first switch group and a positive terminal of an n-th semiconductor switch composing the second switch group, the third group being connected to a negative terminal of the first semiconductor switch of the first switch group, each of the third and fourth switch groups comprising series-connected (n−1) semiconductor switches; and an AC switch composed of a combination of reverse-blocking semiconductor switches connected between a connection point of the third switch group and the fourth switch group and a middle terminal of the DC power supply; wherein a j-th capacitor, j being an integer from 1 to (n−2), is connected between a positive terminal of an (n−m)-th semiconductor switch composing the first switch group, m being an integer from 0 to (n−3), and a negative terminal of a k-th semiconductor switch composing the second switch group, k being an integer from 1 to (n−2); an (n−1)-th capacitor is connected between a positive side terminal of the third switch group and a negative side terminal of the fourth switch group; an i-th capacitor, i being an integer from n to (2n−3), is connected between a positive terminal of (n−m−1)-th semiconductor switch composing the third switch group and a negative terminal of k-th semiconductor switch composing the fourth switch group; a connection point between the first switch group and the second switch group is an AC terminal; and at least one linking means connects a terminal of the j-th capacitor and a terminal of the i-th capacitor.

Embodiment Example 1

Figure 1:
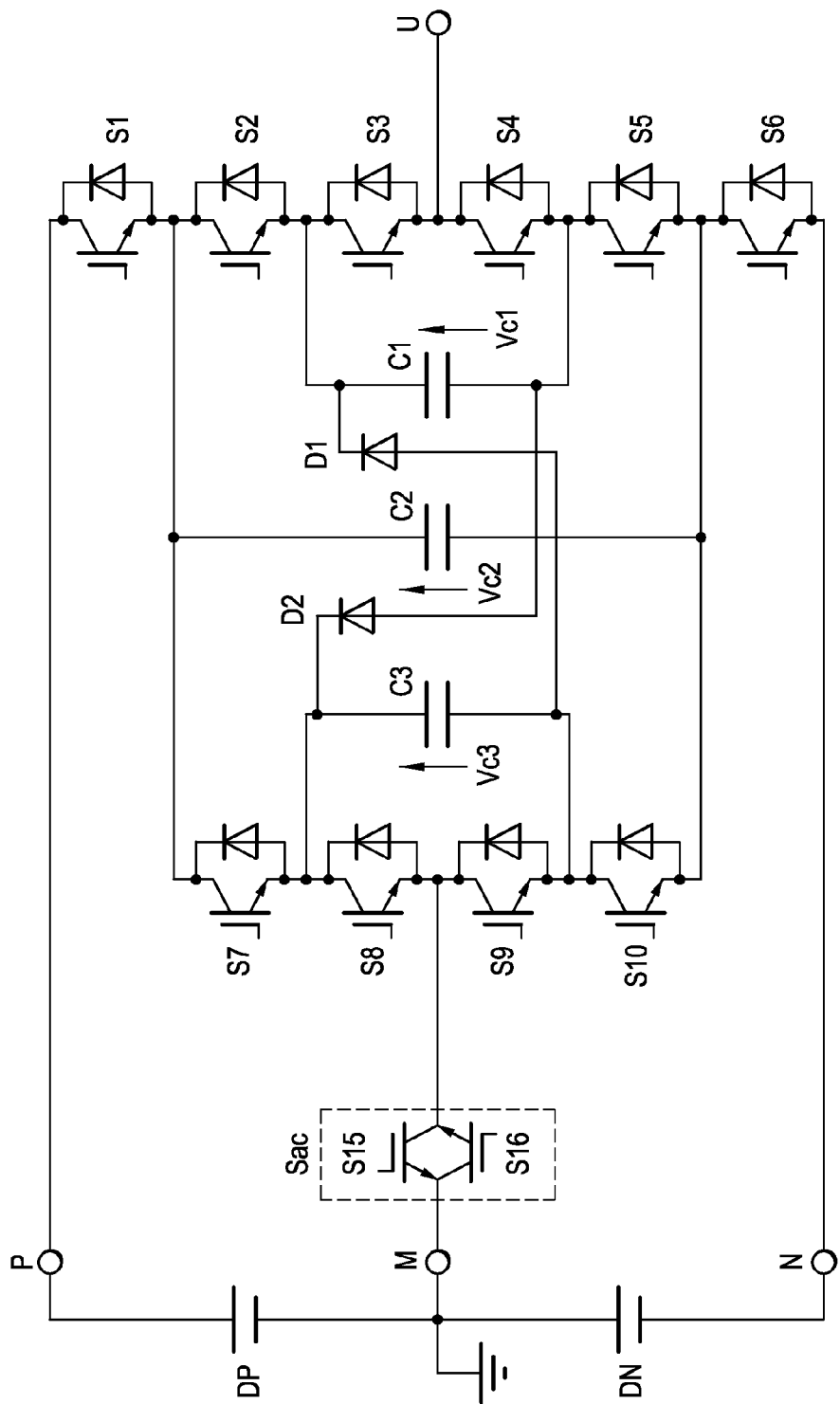
FIG. 1 is a circuit diagram of an example of multilevel conversion circuit according to the first embodiment of the present invention.

FIG. 1 is a circuit diagram of an example of multilevel conversion circuit according to a first embodiment of the present invention. This is a seven-level conversion circuit that is an example of the number n in claims of three. A DC power supply consisting of series-connected DC single power supplies DP and DN has terminals of a positive terminal P, a zero terminal M, and a negative terminal N in the order of descending electric potential values. The terminal M is the base terminal at a potential of zero. Semiconductor switches in the following description are IGBTs each having an antiparallel-connected diode. The other types of semiconductor switchers can be employed, of course. A series circuit of semiconductor switches S1 through S6 are connected between the positive terminal P and the negative terminal N. The connection point between the semiconductor switches S3 and S4 is an AC terminal U. A series circuit of semiconductor switches S7 through S10 and a capacitor C2 are connected in parallel between the connection point between the semiconductor switches S1 and S2 and the connection point between the semiconductor switches S5 and S6. An AC switch Sac composed of semiconductor switches of antiparallel-connected reverse blocking IGBTs S15 and S16 is connected between the zero terminal M and the connection point between the semiconductor switches S8 and S9.

Further, a capacitor C1 is connected between the higher potential terminal of the semiconductor switch S3 and the lower potential terminal of the semiconductor switch S4, and a capacitor C3 is connected between the higher potential terminal of the semiconductor switch S8 and the lower potential terminal of the semiconductor switch S9. A diode D1 that is a linking means is connected between the higher potential terminal of the capacitor C1 and the lower potential terminal of the capacitor C3, and a diode D2 that is a linking means is connected between the higher potential terminal of the capacitor C3 and the lower potential terminal of the capacitor C1.

In the case the voltages of the DC single power supplies DP and DN are each 3E, the voltage across the capacitor C1 is E, the voltage across the capacitor C2 is 2E, and the voltage across the capacitor C3 is E, a voltage +3E is delivered at the AC terminal U when the semiconductor switches S1, S2, S3, S9, S10, and S16 are in an ON state and the other semiconductor switches are in an OFF state. If the relationship between the voltages Vc1, Vc2, and Vc3 of the respective capacitors C1, C2, and C3 is Vc2>Vc1+Vc3, the capacitor C2 is discharged and the capacitors C1 and C2 are charged so that the relationship Vc2=Vc1+Vc3 is reached. The current Ic between the capacitors C1, C2, and C3 flows, as shown by the dotted line in FIG. 2A, through the path of the capacitor C2→the semiconductor switch S2→the capacitor C1→the diode D2→the capacitor C3→the semiconductor switch S10→the capacitor C2. The sum of the voltage Vc1 of the capacitor C1 and the voltage Vc3 of the capacitor C3 is clamped at the voltage Vc2 of the capacitor C2 in the mode shown in FIG. 2A and also in other modes in which at least the semiconductor switches S2 and S10 are in the ON state and a path is formed to charge the capacitor C1 and the capacitor C3 from the capacitor C2.

A voltage zero is delivered at the AC terminal U when the semiconductor switches S3, S5, S7, S9, S15, and S16 are in an ON state and the other semiconductor switches are in an OFF state. Here, if the relationship between the voltages Vc1, Vc2, and Vc3 of the respective capacitors C1, C2, and C3 is Vc2>Vc1+Vc3, the capacitor C2 is discharged and the capacitors C1 and C2 are charged so that the relationship Vc2=Vc1+Vc3 is reached. The current Ic between the capacitors C1, C2, and C3 flows, as shown by the dotted line in FIG. 2B, through the path of the capacitor C2→the semiconductor switch S7→the capacitor C3→the diode D1→the capacitor C1→the semiconductor switch S5→the capacitor C2. The sum of the voltage Vc1 of the capacitor C1 and the voltage Vc3 of the capacitor C3 is clamped at the voltage Vc2 of the capacitor C2. The sum of the voltage Vc1 of the capacitor C1 and the voltage Vc3 of the capacitor C3 is clamped at the voltage Vc2 of the capacitor C2 in the mode shown in FIG. 2B and also in other modes in which at least the semiconductor switches S5 and S7 are in the ON state and a path is formed to charge the capacitor C1 and the capacitor C3 from the capacitor C2. Here, when appropriate path is selected, similarly to the conventional technology, to control the voltage across the capacitor C1 at E and the voltage across the capacitor C2 at 2E, the voltage across the capacitor C3 becomes at E. Thus, the voltage across the capacitor C3 does not need to be detected, eliminating a detecting circuit for the voltage and achieving cost reduction.

Embodiment Example 2

Figure 3:
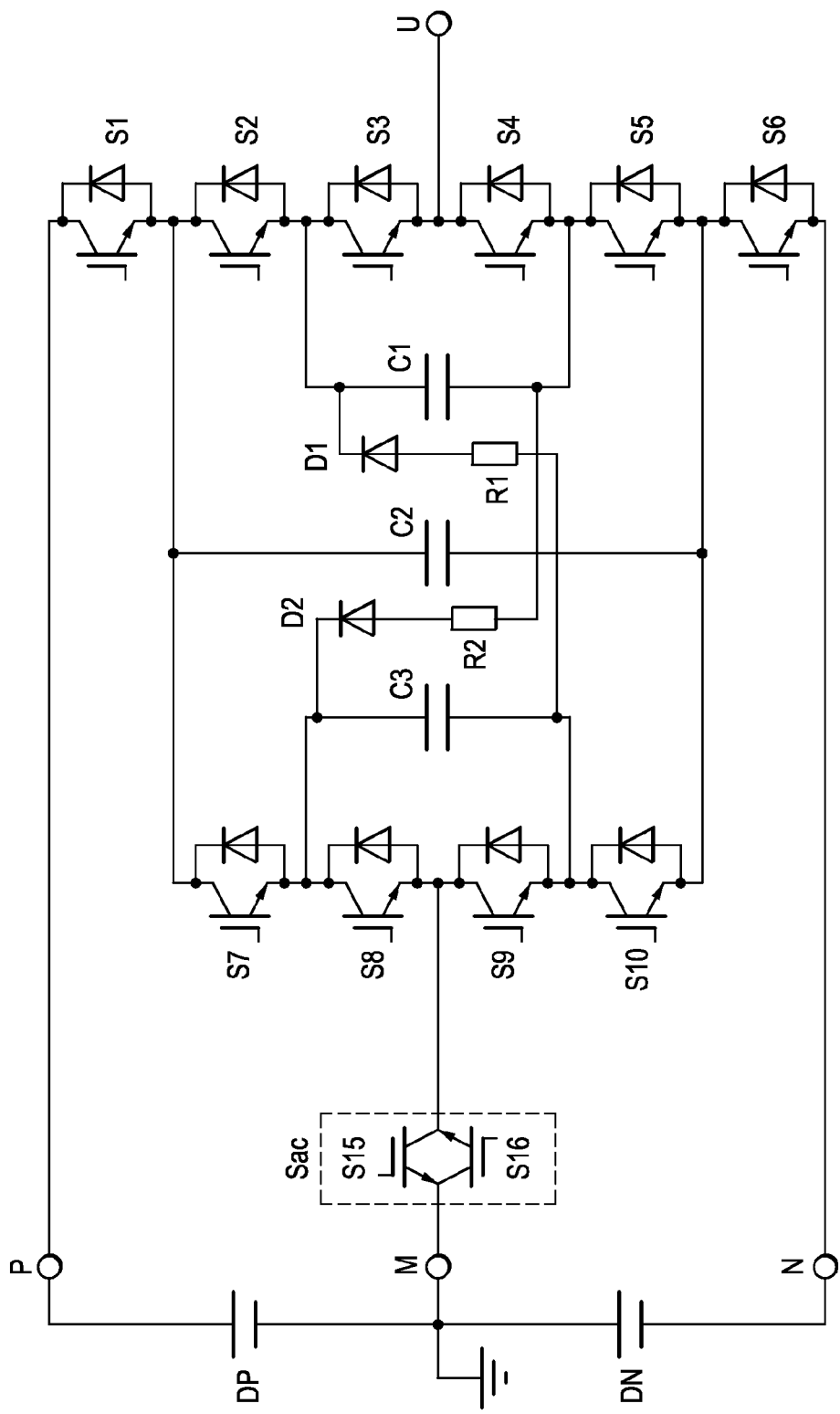
FIG. 3 is a circuit diagram of an example of multilevel conversion circuit according to the second embodiment of the present invention.

FIG. 3 shows a multilevel conversion circuit according to a second embodiment of the invention. This circuit uses a resistance for an impedance element. Linking means in this Embodiment Example 2 are a series circuit of a diode D1 and a resistor R1 and a series circuit of diode D2 and a resistor R2, in place of the diodes in Embodiment Example 1. Operation of the semiconductor switches and relationship between the capacitor voltages Vc1, Vc2, and Vc3 are the same as those in Embodiment Example 1. Voltage detection of the capacitor C3 is also not necessary in this Embodiment Example 2. The resistors used in the linking means enables a charging time adjusted. When an inductor is used instead of the resistor, inrush current is suppressed.

Embodiment Example 3

Figure 4:
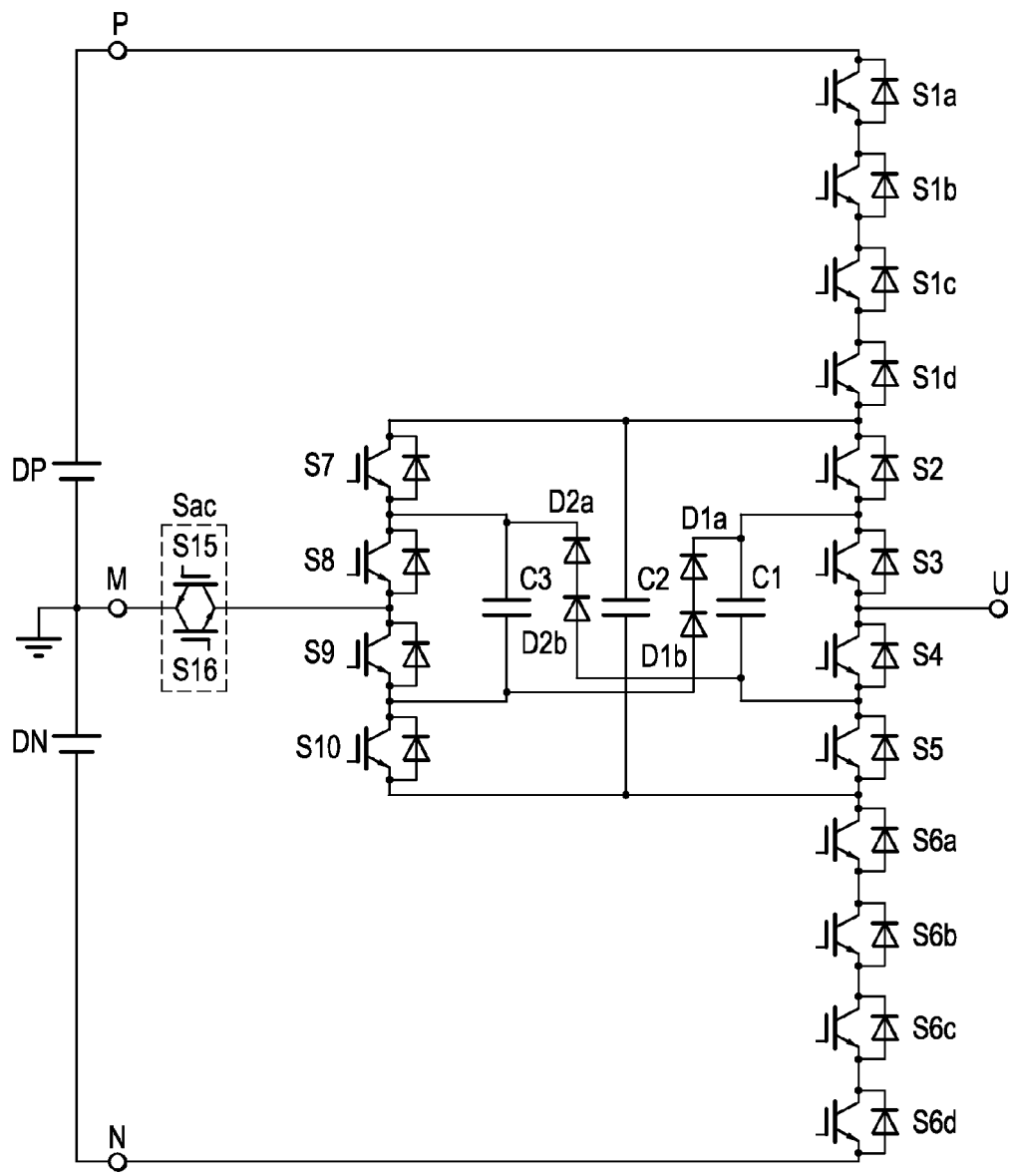
FIG. 4 is a circuit diagram of an example of multilevel conversion circuit according to the third embodiment of the present invention.

FIG. 4 shows a multilevel conversion circuit according to Embodiment Example 3 of the present invention. This circuit is a modified one from the circuit of Embodiment example 1 into a circuit in which all semiconductor switches and diodes have an equal withstand voltage. The number n in this example is again three. The semiconductor switch S1 and the semiconductor switch S6 in FIG. 1 are replaced by series-connected four semiconductor switches S1a through S1d and series-connected four semiconductor switches S6a through S6d, respectively. The diode D1 and the diode D2, which are linking means in FIG. 1, are changed to series-connected two diodes D1a and D1b and series-connected two diodes D2a and D2b, respectively. Operation of the semiconductor switches and relationship between the capacitor voltages Vc1, Vc2, and Vc3 are the same as those in Embodiment Example 1. Voltage detection of the capacitor C3 is also not necessary in this Embodiment Example 3. Because all the semiconductor switches and diodes have an equal withstand voltage, this conversion circuit has advantages of simplified device construction and easy parts management.

Embodiment Example 4

Figure 5:
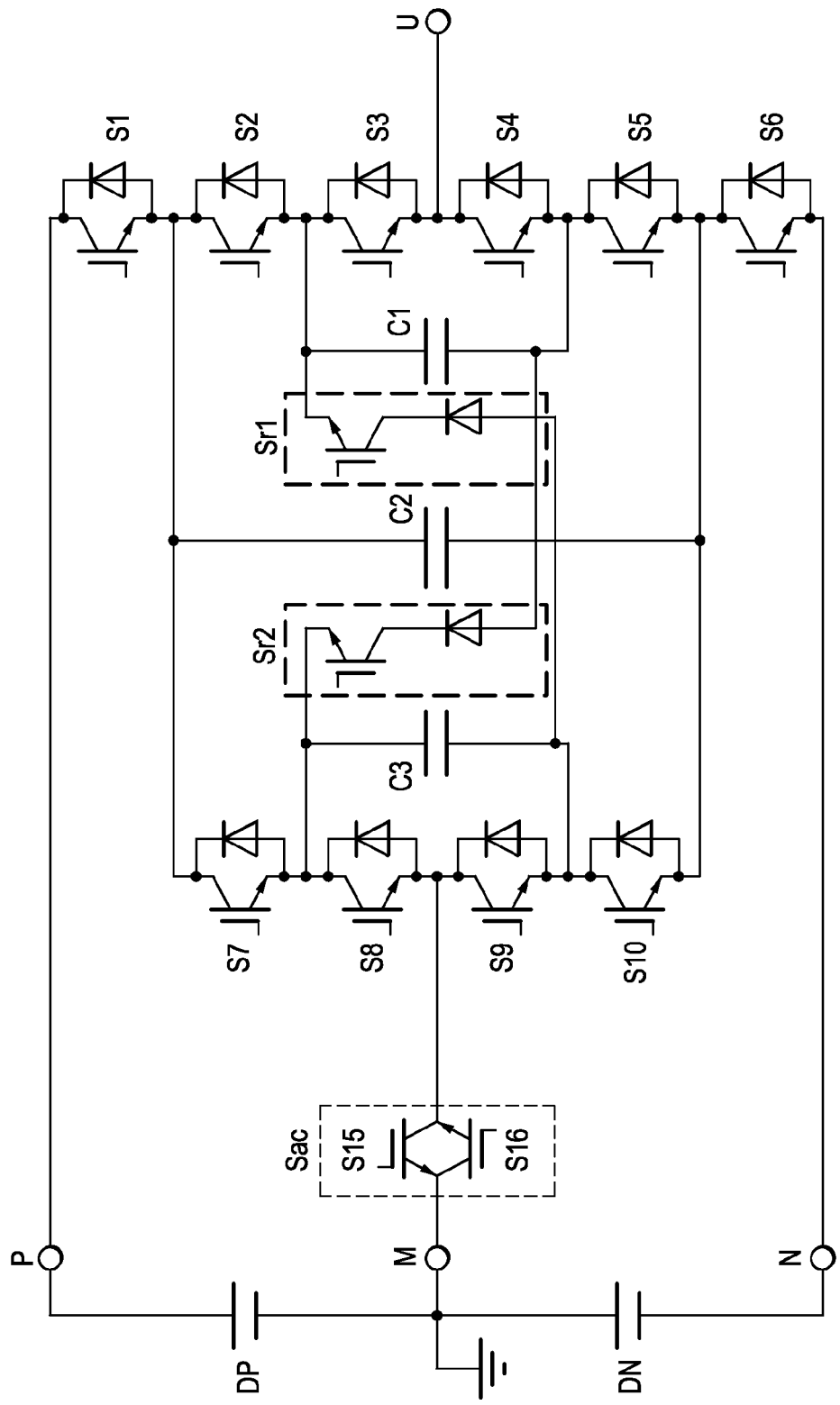
FIG. 5 is a circuit diagram of an example of multilevel conversion circuit according to the fourth embodiment of the present invention.

FIG. 5 shows a multilevel conversion circuit according to Embodiment Example 4 of the present invention. In this circuit of Embodiment Example 4, the linking means of the diodes D1 and D2 in Embodiment Example 1 is replaced by a linking means of semiconductor switches Sr1 and Sr2 with reverse-blocking ability. While each of the semiconductor switches Sr1 and Sr2 with reverse-blocking ability of the circuit of FIG. 5 consists of a diodes and an IGBT without reverse-blocking ability, a reverse blocking IGBT can eliminates the series-connected diode in the circuit of FIG. 5. If the semiconductor switches Sr1 and Sr2 are made constantly in an ON state, the circuit of this embodiment provides the same effect as the circuit of Embodiment Example 1. When it is impossible to maintain the relationship of the voltages across the capacitors C1 and C3 at the value E and the voltage across the capacitor C2 at the value 2E in the circuit of Embodiment Example 1, the semiconductor switch Sr1 or Sr2 is ON/OFF operated to control the capacitor voltages to desired values. Operation of the conversion circuit under the condition of the ON states of the semiconductor switches Sr1 and Sr2 are the same as those in Embodiment Example 1. Voltage detection of the capacitor C3 is also not necessary in this Embodiment Example 4. When a current path is appropriately selected, as in the conventional technology, to control the voltage across the capacitor C1 at E and the voltage across the capacitor C2 at 2E, the voltage across the capacitor C3 becomes at the desired value of E without a voltage detection circuit. When resistances or inductances are added to the reverse-blocking semiconductor switches Sr1 and Sr2, the effects same as those in Embodiment Example 2 are obtained.

Embodiment Example 5

Figure 2A:
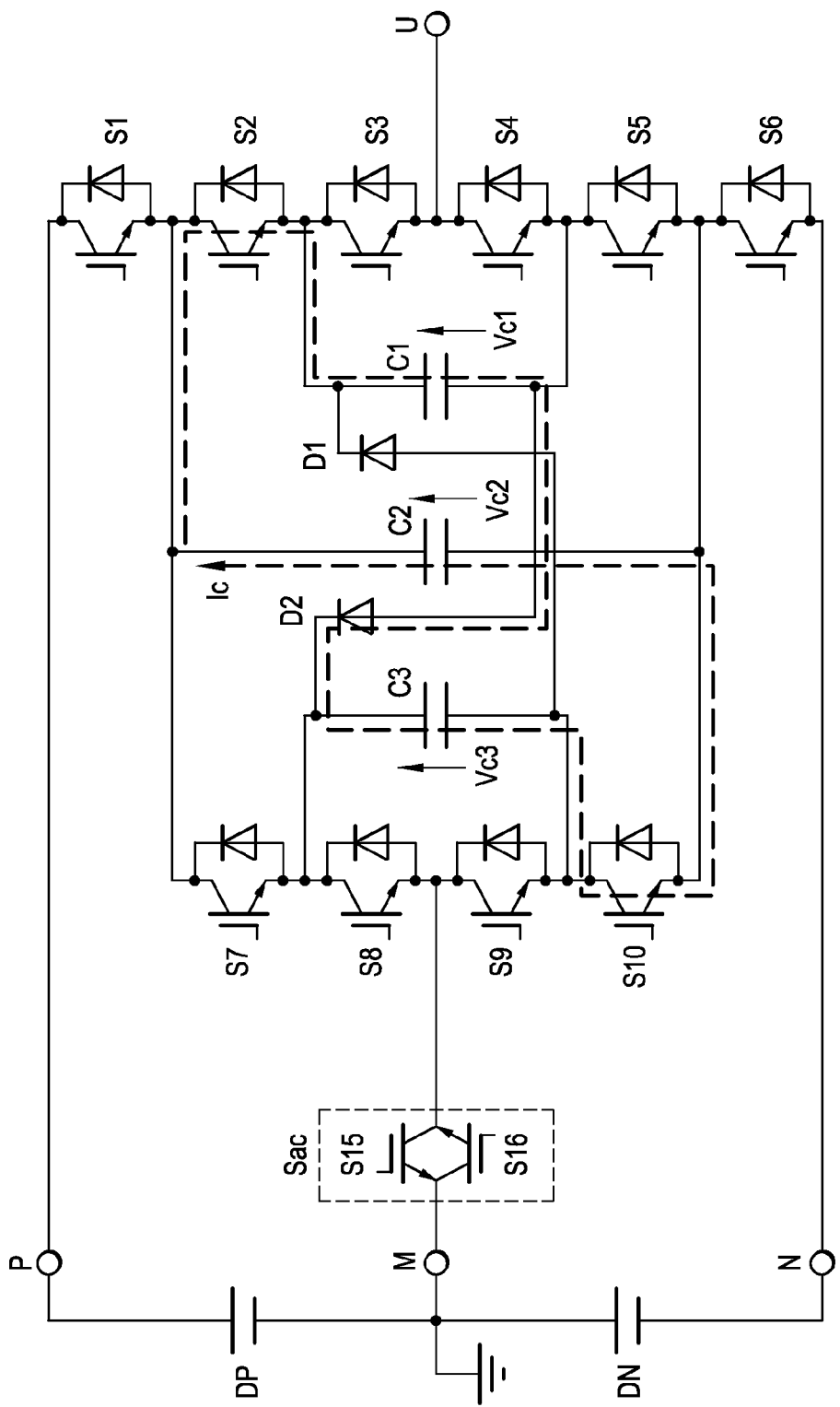
FIG. 2A illustrates an operation mode of the multilevel conversion circuit according to the first embodiment of the present invention.
Figure 2B:
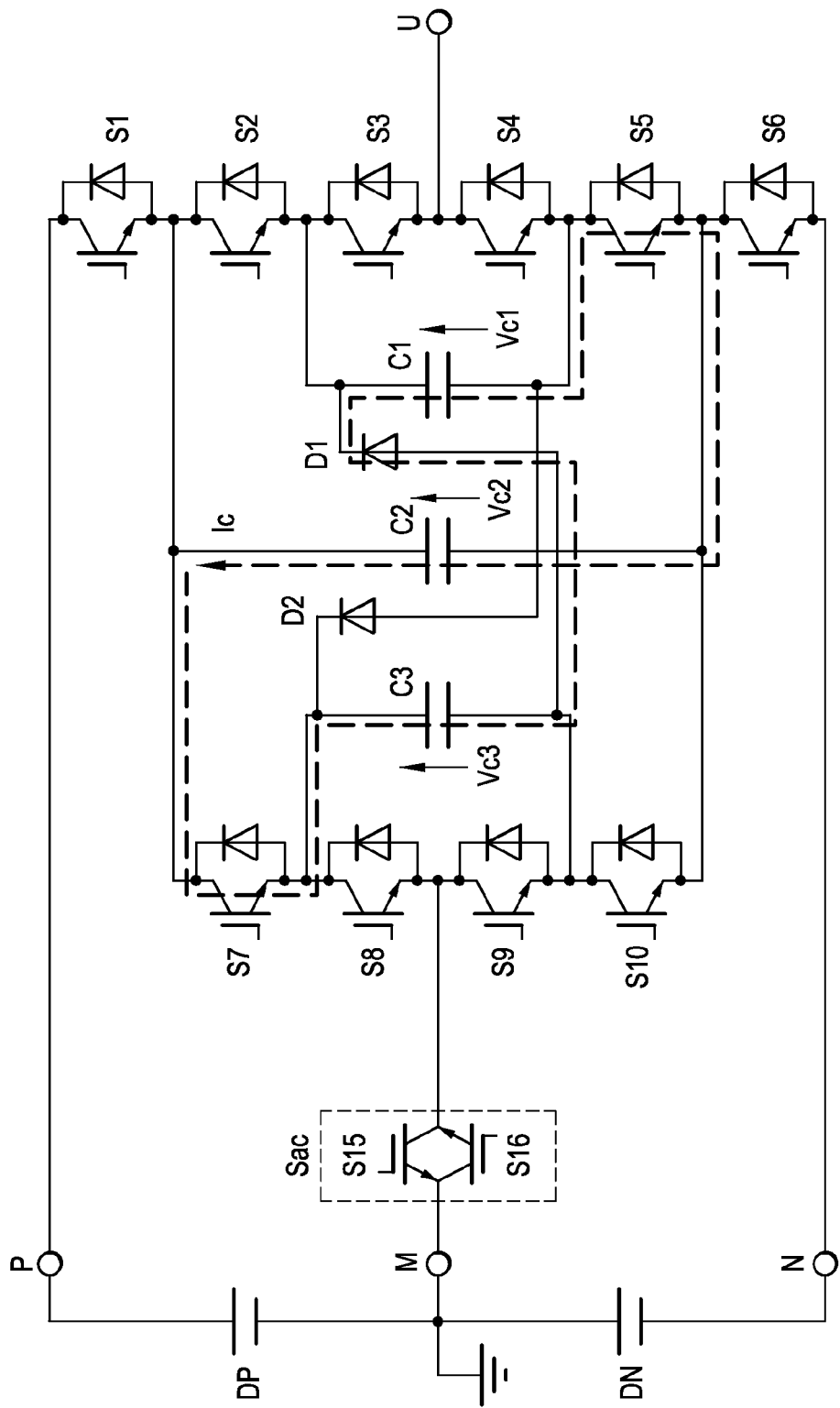
FIG. 2B illustrates another operation mode of the multilevel conversion circuit according to the first embodiment of the present invention.
Figure 6:
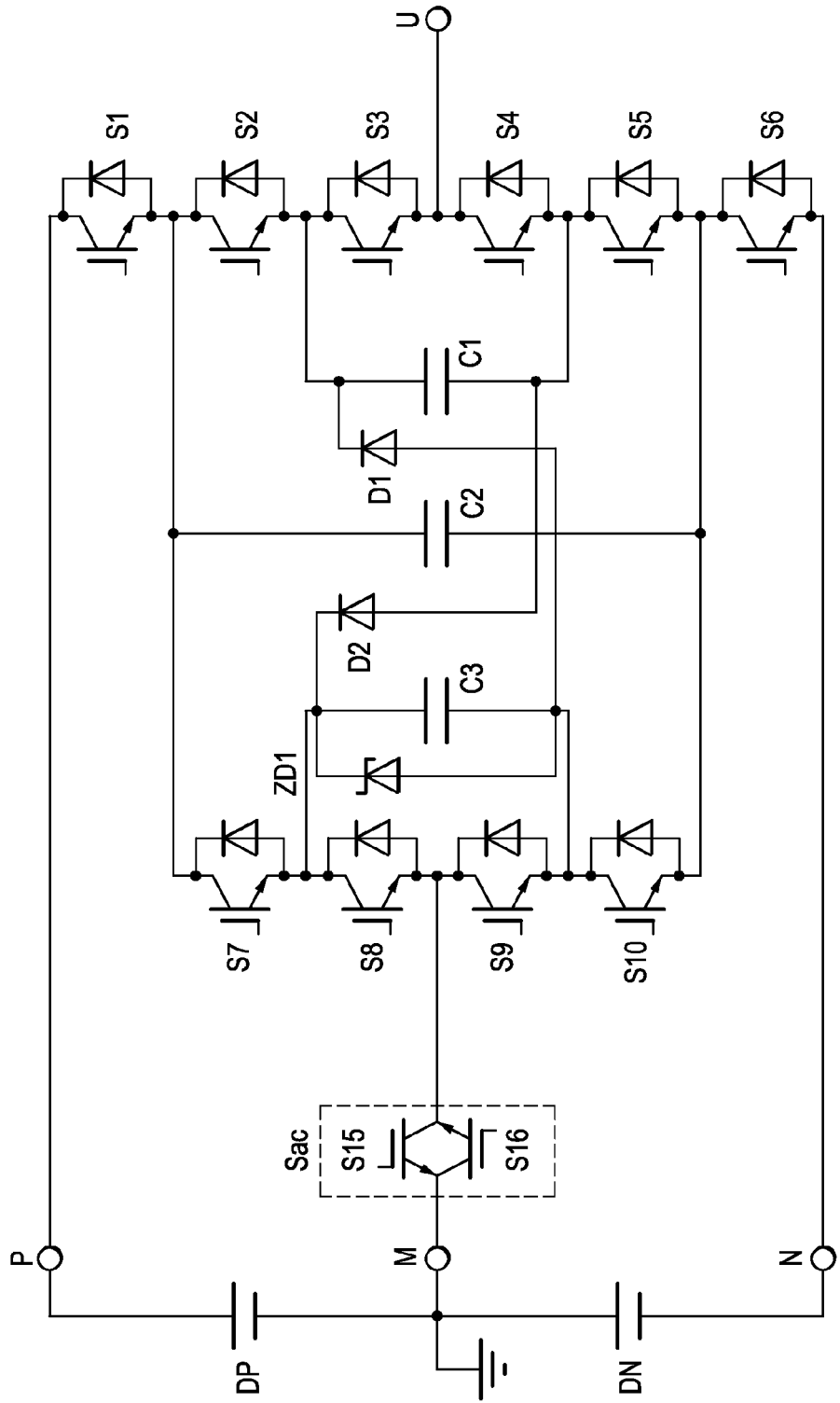
FIG. 6 is a circuit diagram of an example of multilevel conversion circuit according to the fifth embodiment of the present invention.

FIG. 6 shows a multilevel conversion circuit according to Embodiment Example 5 of the present invention. In this circuit of Embodiment Example 5, a Zener diode ZD1 is connected in parallel to the capacitor C3 in the circuit of Embodiment Example 1. When a current path is appropriately selected, as in the conventional technology, to control the voltage across the capacitor C1 at E and the voltage across the capacitor C2 at 2E, the voltage across the capacitor C3 becomes at the desired value of E without a voltage detection circuit. In the circuit of Embodiment Example 1 as shown in FIGS. 2A and 2B, the capacitors C1 and C3 are always charged. As a result, the capacitors may suffer over-voltage, which requires discharging. To cope with this issue, the Zener diode is provided in parallel to the capacitors and the capacitor voltages are clamped at the Zener voltage, thereby allowing discharging as well as charging. Whereas the Zener diode is connected in parallel to the capacitor C3 in the embodiment of FIG. 6, the Zener diode can be connected in parallel to one, two, or three of the capacitors C1, C2 and C3.

Embodiment Example 6

Figure 7:
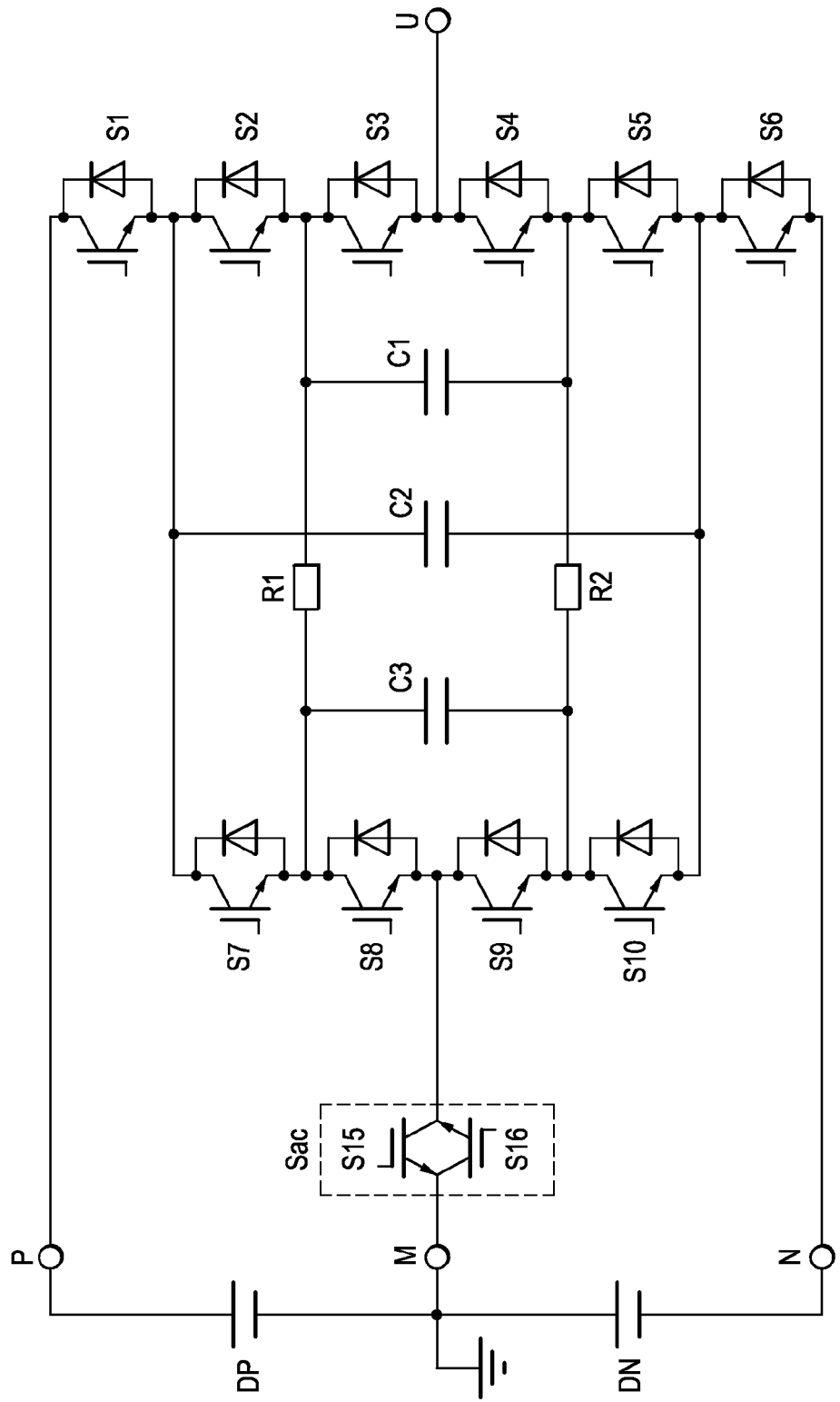
FIG. 7 is a circuit diagram of an example of multilevel conversion circuit according to the sixth embodiment of the present invention.
Figure 8:
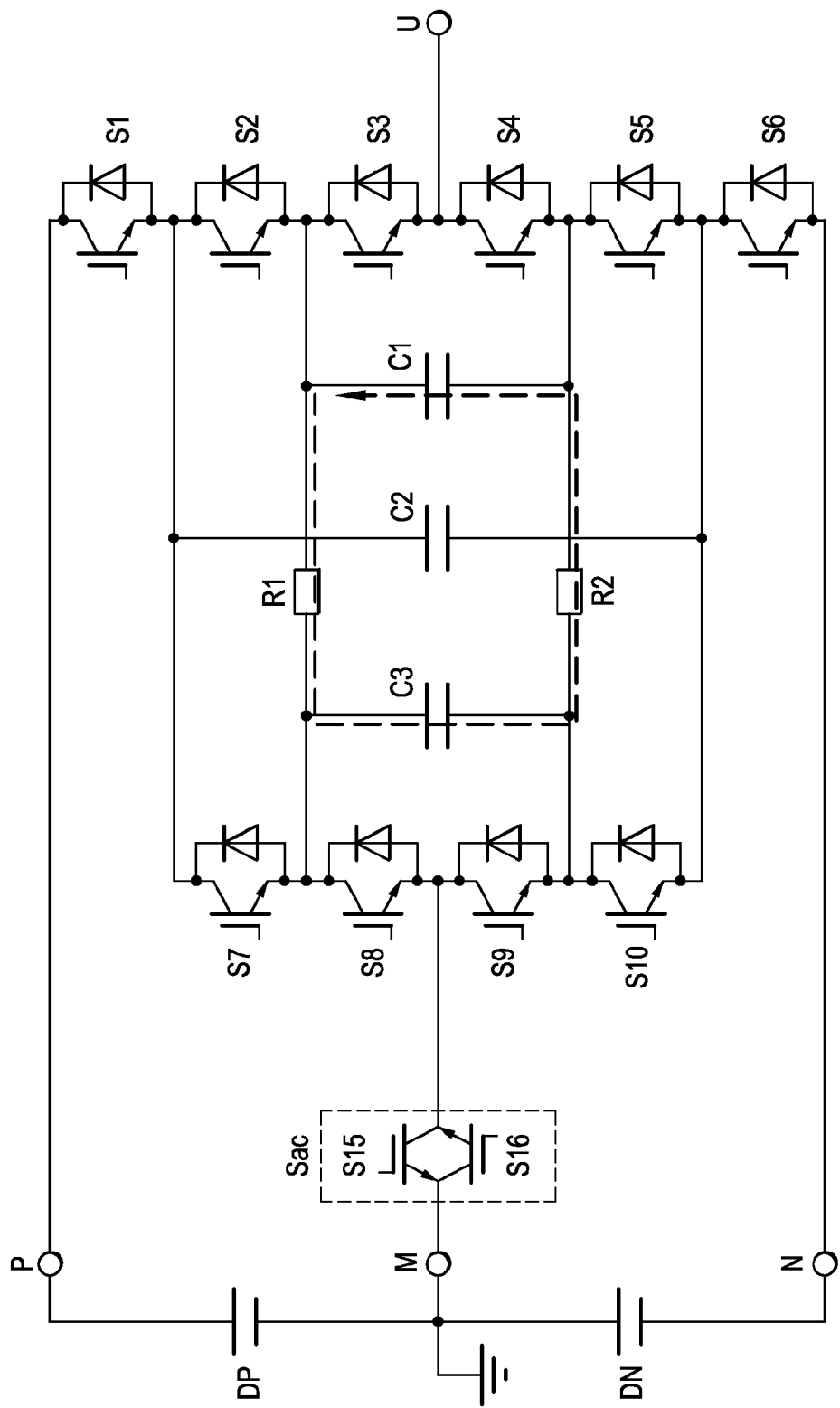
FIG. 8 illustrates the operation of the multilevel conversion circuit according to the sixth embodiment of the present invention.
Figure 12:
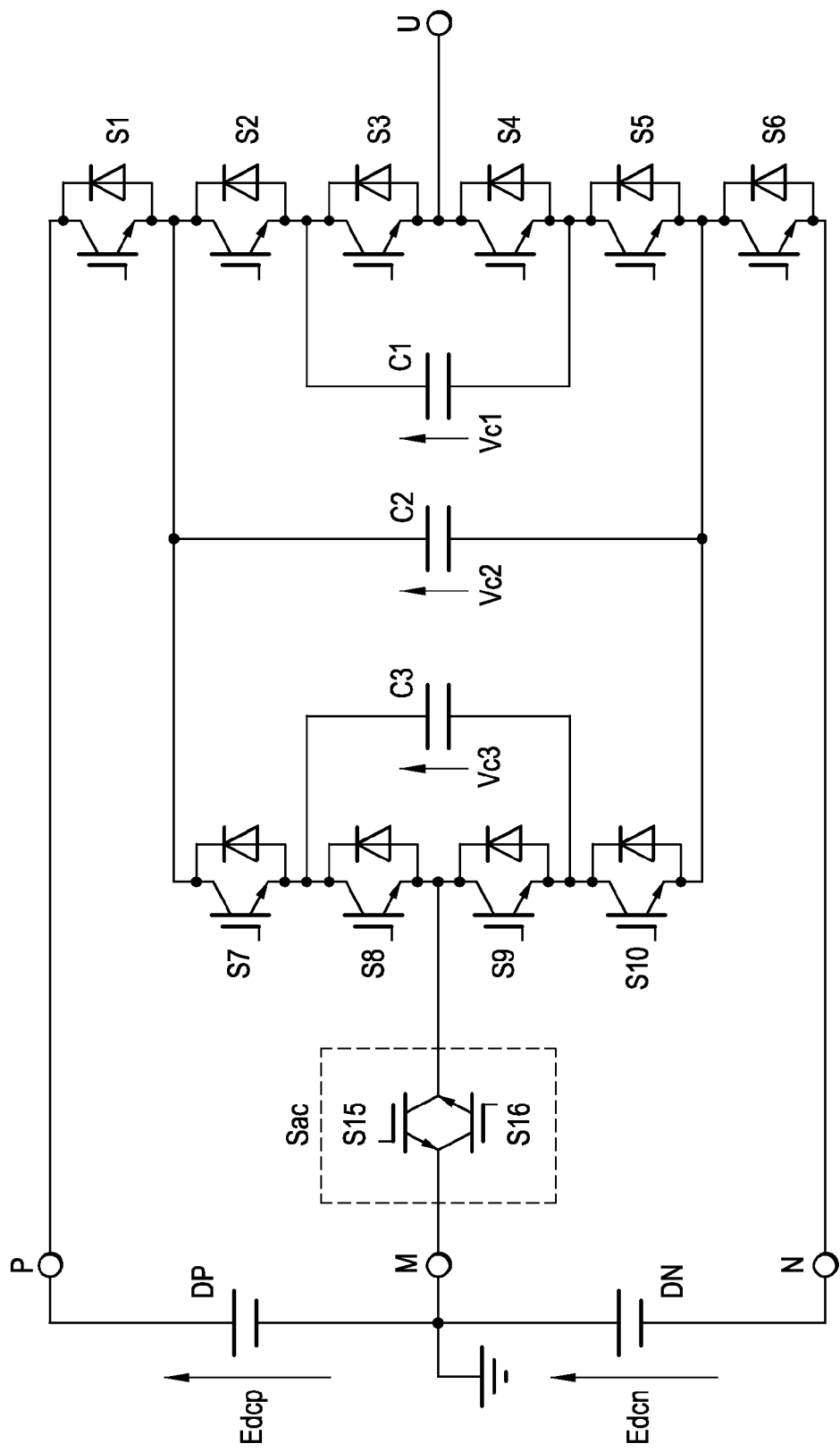
FIG. 12 shows an example of conventional seven level conversion circuit of an improved type.

FIG. 7 shows a multilevel conversion circuit according to Embodiment Example 6 of the present invention. This circuit of Embodiment Example 6 has a construction of the conventional example of FIG. 12 with additional resistors R1 connected between the positive potential terminal of the capacitor C1 and the positive potential terminal of the capacitor C3 and R2 connected between the negative potential terminal of the capacitor C1 and the negative potential terminal of the capacitor C3. This construction allows charging or discharging the capacitors C1 and C3 to equalize the voltage Vc1 of the capacitor C1 and the voltage Vc3 of the capacitor C3. If the relationship between the capacitor voltage Vc1 and the capacitor voltage Vc3 is Vc1>Vc3, a current flows, as shown with the dotted line in FIG. 8, in the path of the capacitor C1→resistor R1→capacitor C3→resistor R2→capacitor C1, and the voltages becomes Vc1=Vc3. On the contrary, if the relationship between the capacitor voltage Vc1 and the capacitor voltage Vc3 is Vc1<Vc3, a current flows in the path of the capacitor C3→resistor R1→capacitor C1→resistor R2→capacitor C3, and the voltages becomes Vc1=Vc3. When a current path is appropriately selected, as in the conventional technology, to control the voltage across the capacitor C1 at E and the voltage across the capacitor C2 at 2E, the voltage across the capacitor C3 becomes at the desired value of E without a voltage detection circuit. In this Embodiment Example 6, the capacitor voltages Vc1 and Vc3 can be balanced through the resistors even though all the semiconductor switches are in an OFF state. This construction can be applied to a circuit with capacitors that are designed to be controlled at an equal voltage.

Embodiment Example 7

Figure 9:
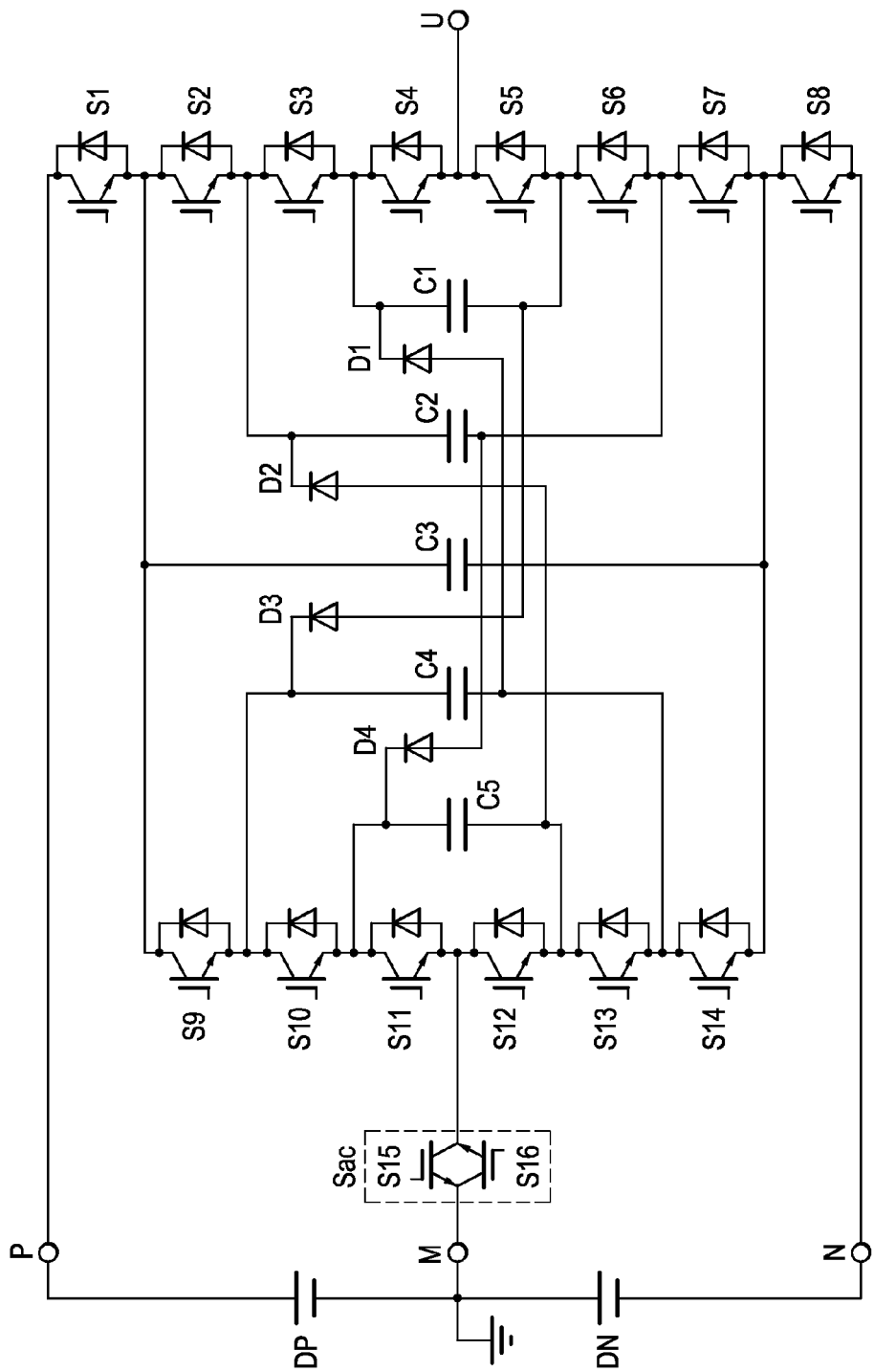
FIG. 9 is a circuit diagram of an example of multilevel conversion circuit according to the seventh embodiment of the present invention.
Figure 10:
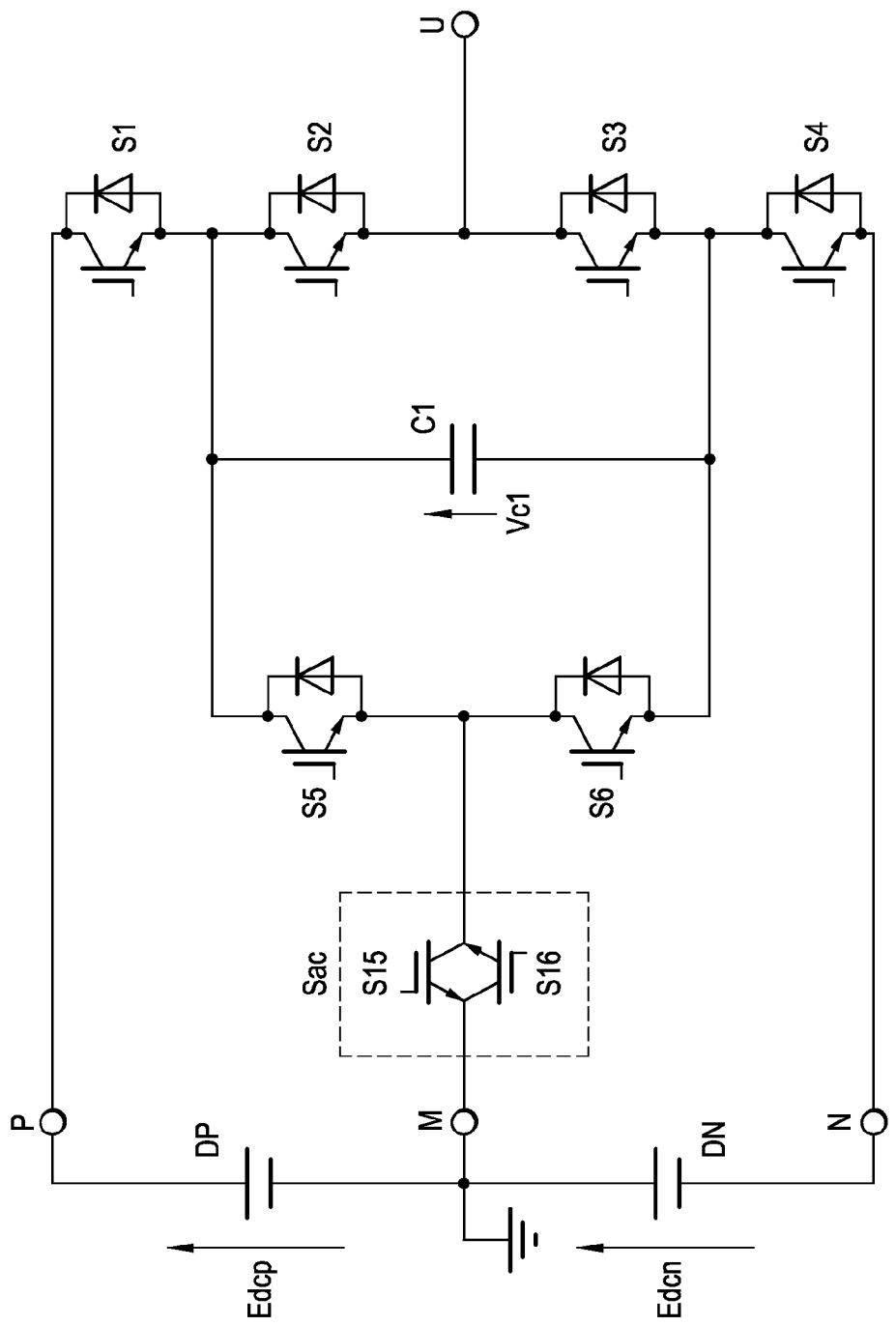
FIG. 10 shows an example of conventional five level conversion circuit.
Figure 11:
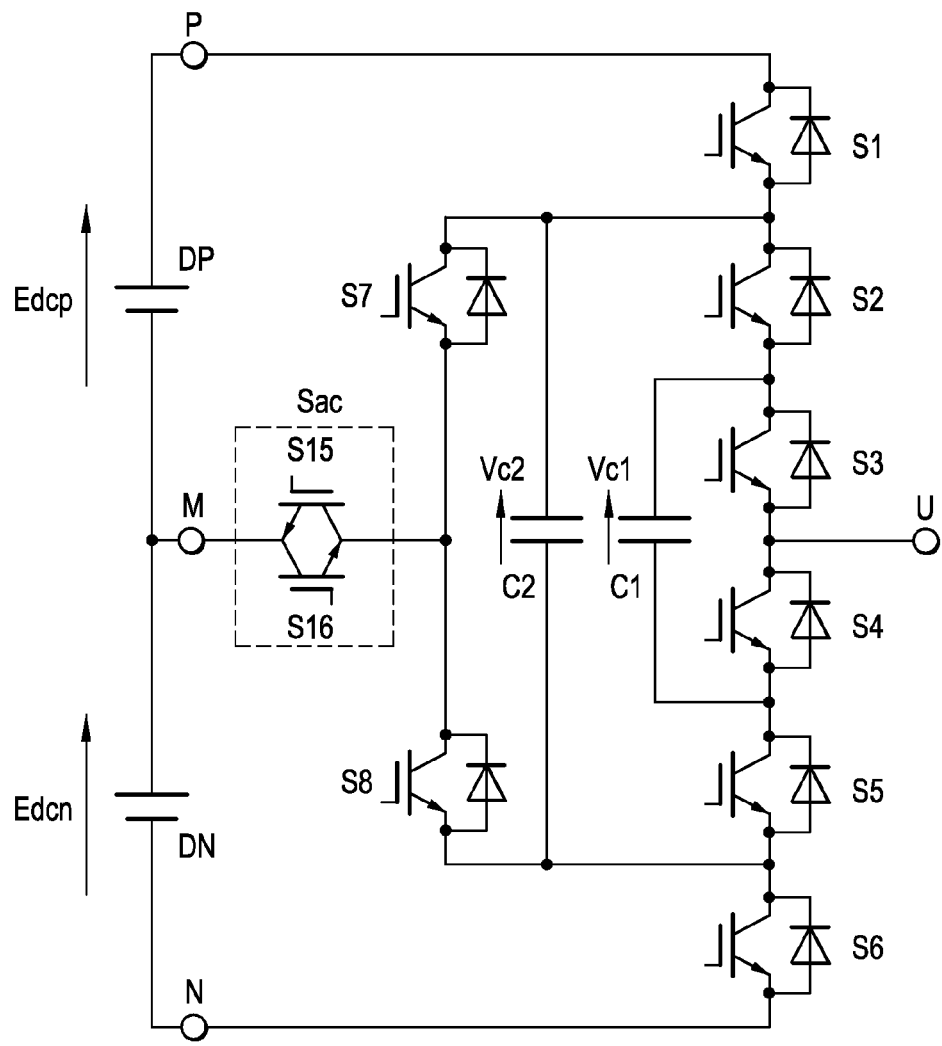
FIG. 11 shows an example of conventional seven level conversion circuit.

FIG. 9 shows a multilevel conversion circuit according to Embodiment Example 7 of the present invention. This circuit of Embodiment Example 7 is a nine-level conversion circuit with the number n in claims of four. For this nine level conversion circuit of a flying capacitor type, a DC power supply consisting of series-connected DC single power supplies DP and DN has terminals of a positive terminal P, a zero terminal M, and a negative terminal N in the order of descending electric potential values. The terminal M is the base terminal at a potential of zero. Semiconductor switches in the following description are IGBTs each having an antiparallel-connected diode. Other types of semiconductor switchers can be employed, of course. A series circuit of semiconductor switches S1 through S8 are connected between the positive terminal P and the negative terminal N. The connection point between the semiconductor switches S4 and S5 is an AC terminal U. A series circuit of semiconductor switches S9 through S14 and a capacitor C3 are connected in parallel between the connection point between the semiconductor switches S1 and S2 and the connection point between the semiconductors switches S7 and S8. An AC switch Sac composed of antiparallel-connected reverse blocking IGBTs S15 and S16 is connected between the zero terminal M and the connection point between the semiconductor switches S11 and S12.

Figure 13A:
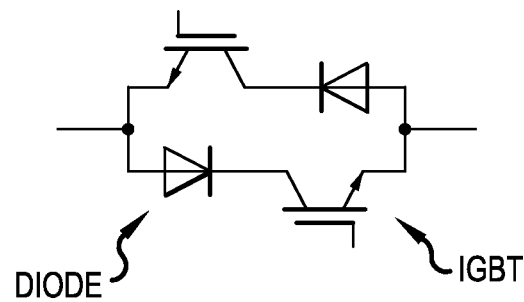
FIGS. 13A-13C show examples of AC switching circuits.
Figure 13B:
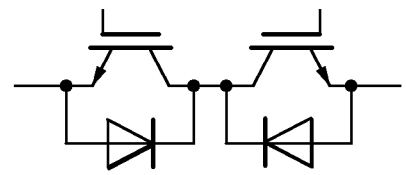
Figure 13C:
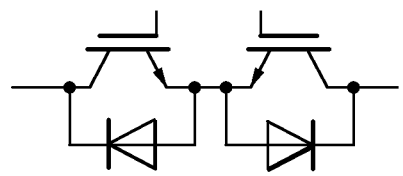
Figure 14A:
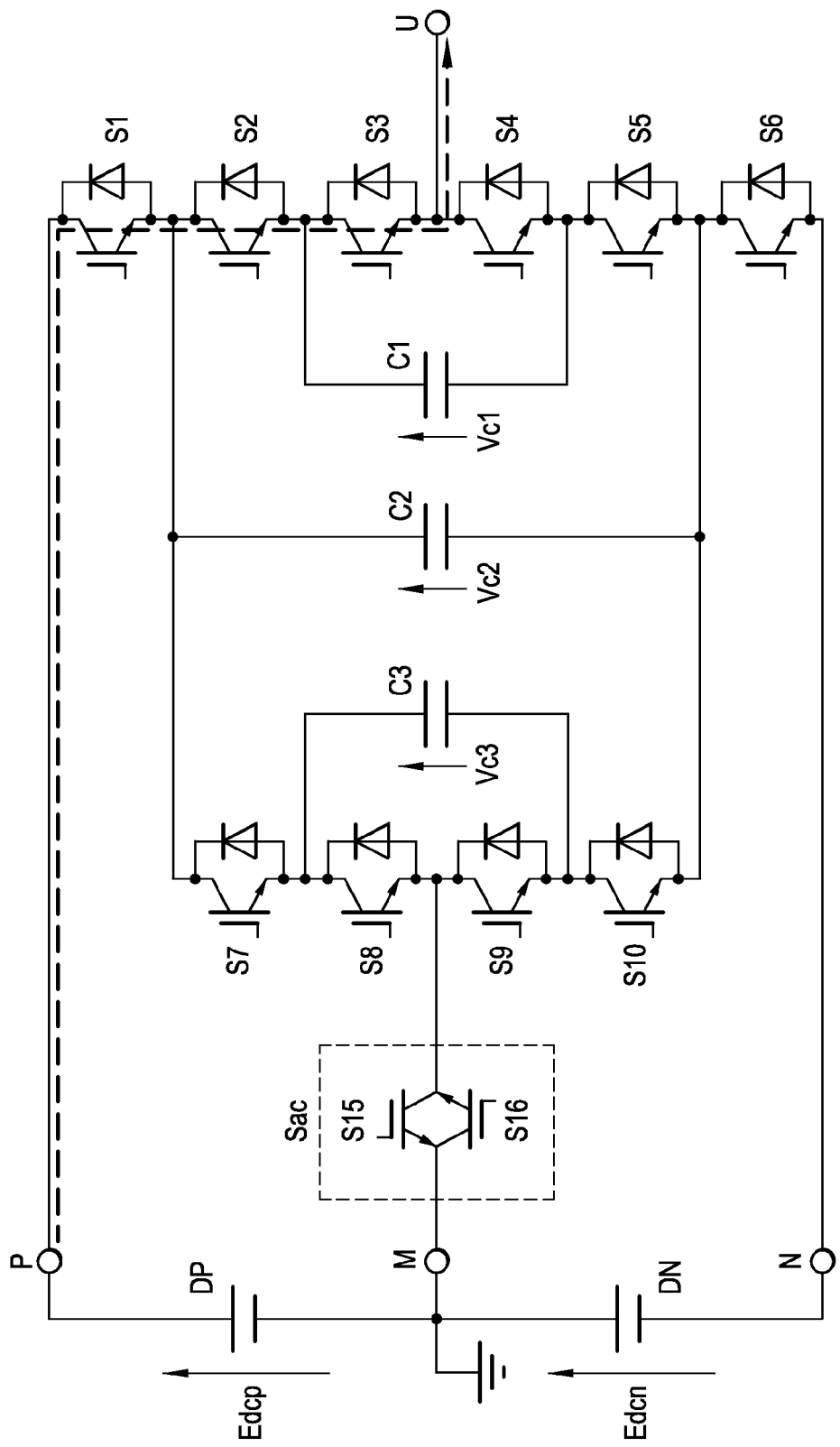
FIG. 14A illustrates an operation mode (a) of the improved seven level conversion circuit.
Figure 14B:
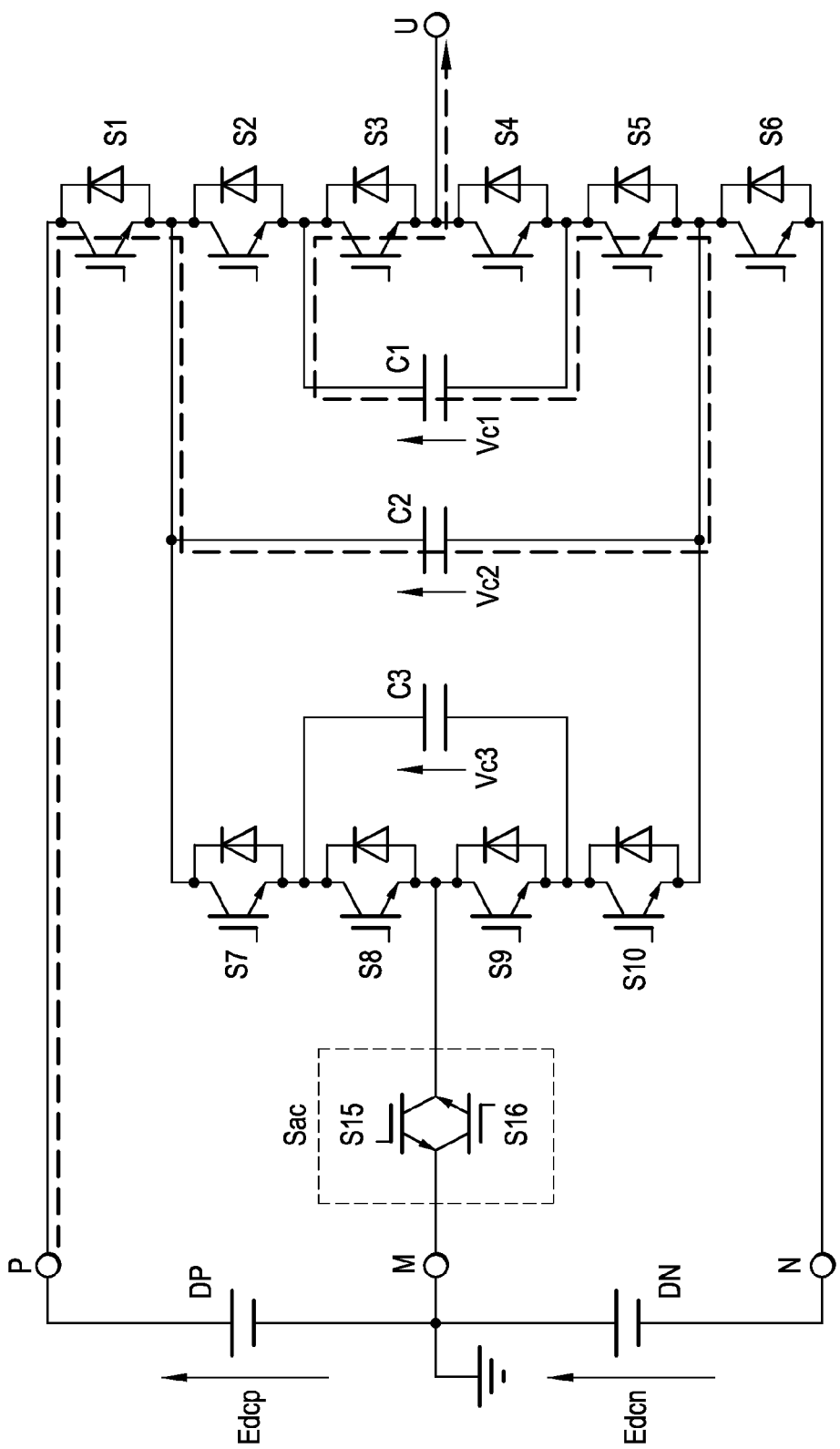
FIG. 14B illustrates an operation mode (b) of the improved seven level conversion circuit.
Figure 14C:
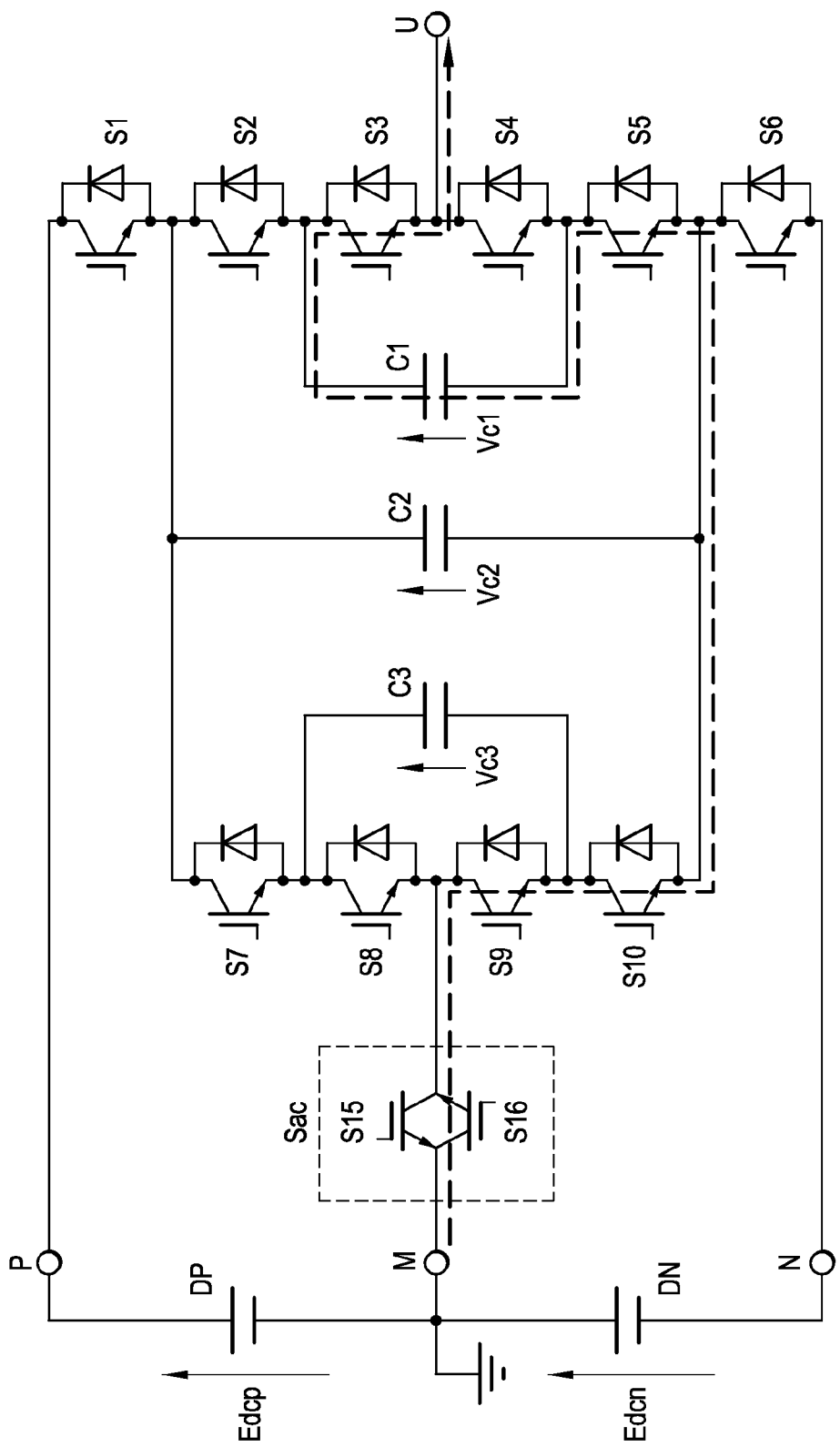
FIG. 14C illustrates an operation mode (c) of the improved seven level conversion circuit.
Figure 14D:
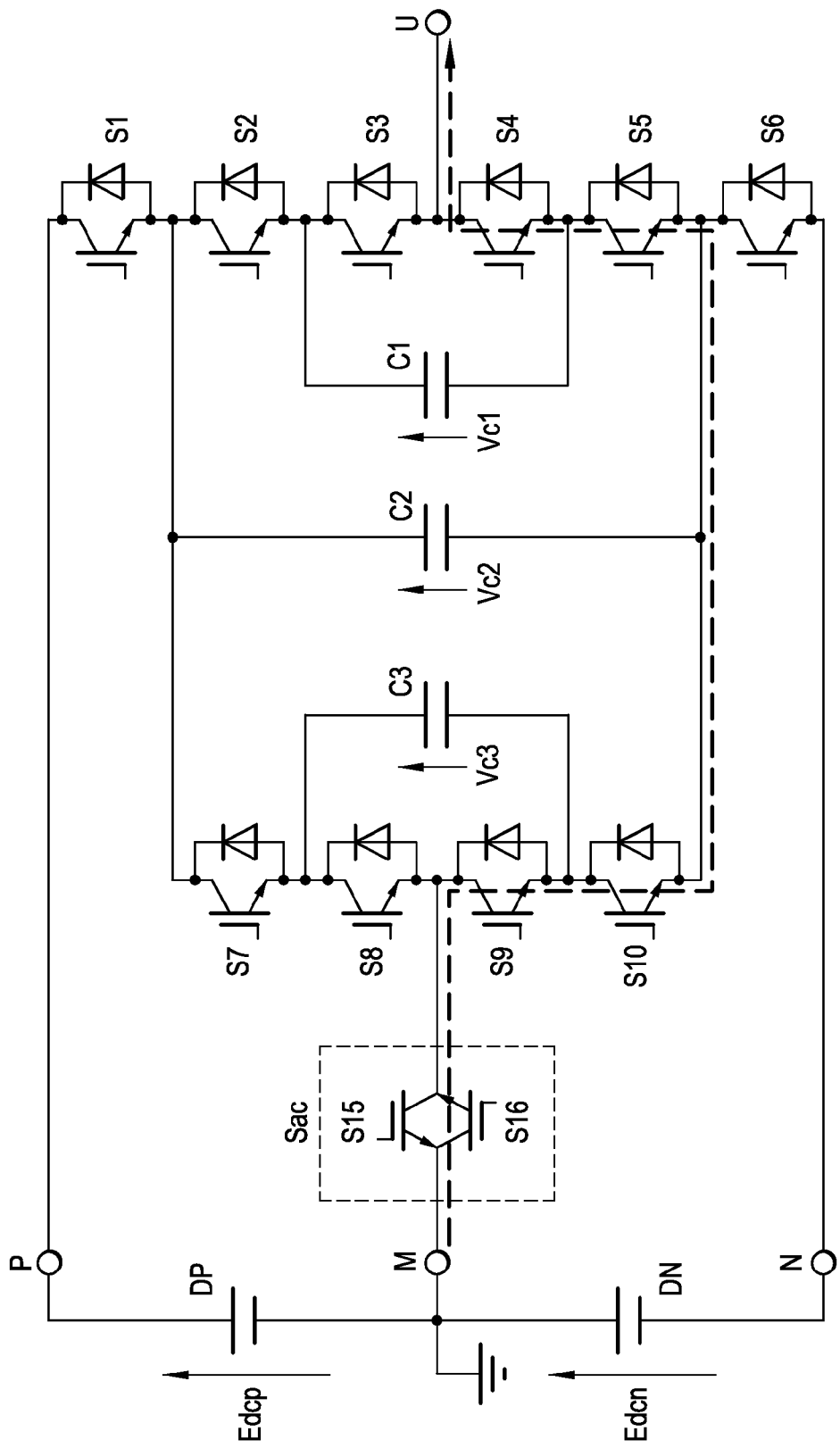
FIG. 14D illustrates an operation mode (d) of the improved seven level conversion circuit.
Figure 14E:
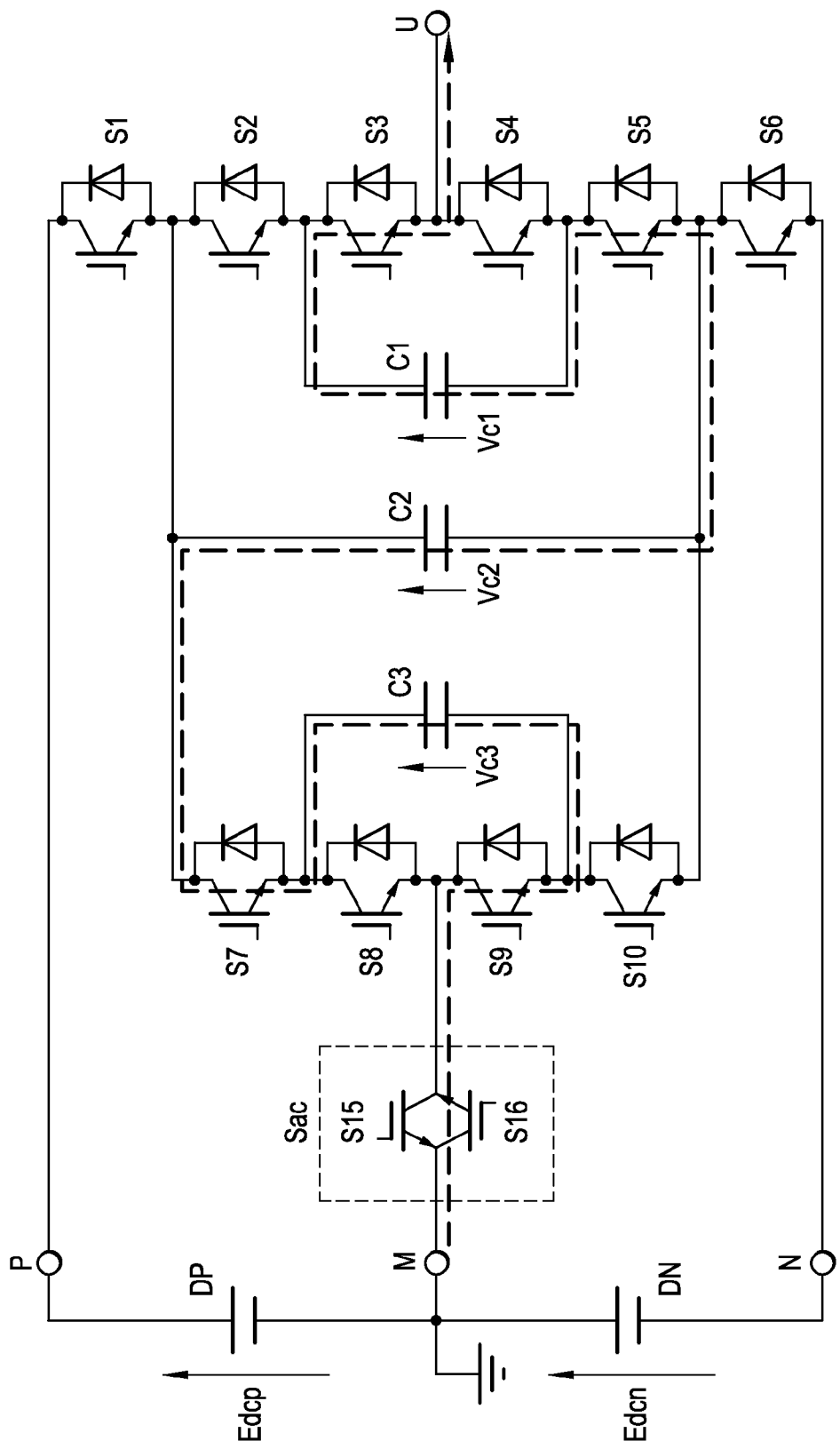
FIG. 14E illustrates an operation mode (e) of the improved seven level conversion circuit.

Further connected are: a capacitor C2 between the higher potential terminal of the semiconductor switch S3 and the lower potential terminal of the semiconductor switch S6, a capacitor C1 between the higher potential terminal of the semiconductor switch S4 and the lower potential terminal of the semiconductor switch S5, a capacitor C4 between the higher potential terminal of the semiconductor switch S10 and the lower potential terminal of the semiconductor switch S13, and a capacitor C5 between the higher potential terminal of the semiconductor switch S11 and the lower potential terminal of the semiconductor switch S12. These capacitors C1 through C5 are called flying capacitors. The AC switch Sac can be composed, in place of using the construction of antiparallel connection of the semiconductor switches S15 and S16 each exhibiting reverse-blocking ability shown in FIG. 9, by combination of IGBTs without reverse-blocking ability and diodes as shown in FIG. 13. Circuit (a) in FIG. 13 is composed of antiparallel-connected two series circuits each consisting of a diode and an IGBT. The circuits (b) and (c) in FIG. 13 are composed of two circuits connected in series, each circuit consisting of antiparallel-connected diode and an IGBT.

Moreover, linking means are provided, which are: a liking means of diode D1 connected between the higher potential terminal of the capacitor C1 and the lower potential terminal of the capacitor C4, a linking means of diode D2 connected between the higher potential terminal of the capacitor C2 and the lower potential terminal of the capacitor C5, a linking means of diode D3 connected between the higher potential terminal of the capacitor C4 and the lower potential terminal of the capacitor C1, and a linking means of diode C4 connected between the higher potential terminal of the capacitor C5 and the lower potential terminal of the capacitor C2.

In the circuit construction of FIG. 9, the magnitudes of each of the voltages of the single power supplies DP and DN is supposed to be 4E. Average values of the voltages Vc1 through Vc5 of the capacitors C1 through C5 are held at Vc1=E, Vc2=2E, Vc3=3E, Vc4=2E, and Vc5=E by charging or discharging the capacitors C1 through C5. The potential at the zero terminal M is supposed to be zero. The output voltage Vu at the AC terminal U can be nine levels of output voltages of ±4E, ±3E, ±2E, ±1E, and 0 by means of ON/OFF operation of the semiconductor switches.

The linking means of diodes D1 through D4 are so connected that the sum of the voltage Vc1 of the capacitor C1 and the voltage Vc4 of the capacitor C4 is equal to the voltage Vc3 of the capacitor C3, and that the sum of the voltage Vc5 of the capacitor C5 and the voltage Vc2 of the capacitor C2 is equal to the voltage Vc3 of the capacitor C3. Because the detailed operation is similar to the operation in Embodiment Example 1, descriptions thereon are omitted here. The sum of the voltage Vc1 of the capacitor C1 and the voltage Vc4 of the capacitor C4 is clamped to the voltage Vc3 of the capacitor C3, and the sum of the voltage Vc5 of the capacitor C5 and the voltage Vc2 of the capacitor C2 is clamped to the voltage Vc3 of the capacitor C3. In this construction, similarly to the conventional technology, the voltages across the capacitors C1, C2, and C3 are detected and charging and discharging paths of the capacitors are appropriately selected to control the voltage of the capacitor C1 at the value E, the voltage of the capacitor C2 at the value 2E, and the voltage of the capacitor C3 at the value 3E. As a result, the voltage of the capacitor C4 becomes at the value 2E without detecting the voltage of the capacitor C4, and the voltage of the capacitor C5 becomes at the value E without detecting the voltage of the capacitor C5. Thus, voltage detecting circuits are unnecessary for the capacitors C4 and C5, reducing the device costs. This nine-level conversion circuit can also employ the circuits of Embodiment Examples 2 through 6.

Whereas the description thus far is given concerning the seven-level conversion circuit and the nine-level conversion circuit, the present invention can be applied to multilevel conversion circuits of 11-levels or more. Whereas the description is given for examples using semiconductor switches of IGBTs, other types of semiconductor switches including MOSFETs and GTOs can also be used in the invented circuits.

The present invention can be applied to high voltage motor driving equipment and power conversion equipment for power system interconnection that deliver a multilevel voltage from a DC power supply consisting of series-connected two DC single power supplies having three terminals.

What is claimed is:
1. A multilevel conversion circuit that generates multi-levels of voltage from a DC power supply provided with three terminals, composed of two single power supplies, and having three different voltage levels including zero, and selects and delivers the multi-levels of voltage, the multilevel conversion circuit comprising:
   first and second switch groups, each switch group comprising series-connected n semiconductor switches, n being an integer of three or larger, having an antiparallel-connected diode;
   third and fourth switch groups, each switch group comprising series-connected (n−1) semiconductor switches; and
   an AC switch composed of a combination of reverse-blocking semiconductor switches; wherein
   a series circuit of the first switch group and the second switch group is connected between a first DC terminal that is one of the three terminals of the DC power supply at the highest potential and a third DC terminal that is one of the three terminals of the DC power supply at the lowest potential, the first switch group being connected to the first DC terminal;

a series circuit of the third switch group and the fourth switch group is connected between a negative terminal of a first semiconductor switch composing the first switch group and a positive terminal of an n-th semiconductor switch composing the second switch group, the third switch group being connected to the negative terminal of the first semiconductor switch of the first switch group;

the AC switch is connected between a connection point of the third switch group and the fourth switch group and a second DC terminal that is one of the three terminals of the DC power supply at a middle potential;

a j-th capacitor, j being an integer from 1 to (n−2), is connected between a positive terminal of an (n−m)-th semiconductor switch composing the first switch group, m being an integer from 0 to (n−3), and a negative terminal of a k-th semiconductor switch composing the second switch group, k being an integer from 1 to (n−2);

an (n−1)-th capacitor is connected between a positive side terminal of the third switch group and a negative side terminal of the fourth switch group;

an i-th capacitor, i being an integer from n to (2n−3), is connected between a positive terminal of (n−m−1)-th semiconductor switch composing the third switch group and a negative terminal of k-th semiconductor switch composing the fourth switch group;

a connection point between the first switch group and the second switch group is an AC terminal; and a linking means connects a terminal of the j-th capacitor and a terminal of the i-th capacitor.

2. The multilevel conversion circuit according to claim 1, wherein a j-th diode, which is the linking means, is connected between a positive terminal of the j-th capacitor and a negative terminal of the i-th capacitor; and an (i−1)-th diode, which is the linking means, is connected between a positive terminal of the i-th capacitor and a negative terminal of the j-th capacitor.

3. The multilevel conversion circuit according to claim 1, wherein a series circuit of a j-th diode and a j-th resistor, the series circuit being the linking means, is connected between a positive terminal of the j-th capacitor and a negative terminal of the i-th capacitor; and a series circuit of an (i−1)-th diode and an (i−1)-th resistor, the series circuit being the linking means, is connected between a positive terminal of the i-th capacitor and a negative terminal of the j-th capacitor.

4. The multilevel conversion circuit according to claim 1, wherein a j-th reverse blocking semiconductor switch, which is the linking means, is connected between a positive terminal of the j-th capacitor and a negative terminal of the i-th capacitor; and an (i−1)-th reverse blocking semiconductor switch, which is the linking means, is connected between a positive terminal of the i-th capacitor and a negative terminal of the j-th capacitor.

5. The multilevel conversion circuit according to claim 1, wherein a j-th impedance element, which is the linking means, is connected between a positive terminal of the j-th capacitor and a positive terminal of the i-th capacitor; and an (i−1)-th impedance element, which is the linking means, is connected between a negative terminal of the i-th capacitor and a negative terminal of the j-th capacitor.

6. The multilevel conversion circuit according to claim 2, wherein a Zener diode is connected in parallel with the j-th capacitor, the (n−1)-th capacitor, or the i-th capacitor.

7. The multilevel conversion circuit according to claim 3, wherein a Zener diode is connected in parallel with the j-th capacitor, the (n−1)-th capacitor, or the i-th capacitor.

8. The multilevel conversion circuit according to claim 4, wherein a Zener diode is connected in parallel with the j-th capacitor, the (n−1)-th capacitor, or the i-th capacitor.

9. The multilevel conversion circuit according to claim 5, wherein a Zener diode is connected in parallel with the j-th capacitor, the (n−1)-th capacitor, or the i-th capacitor.

* * * * *